US011693946B2

(12) United States Patent
Bradley et al.

(10) Patent No.: US 11,693,946 B2
(45) Date of Patent: Jul. 4, 2023

(54) MANAGING PERMISSIONS FOR DIFFERENT WIRELESS DEVICES TO CONTROL A COMMON HOST DEVICE

(71) Applicant: Apple Inc., Cupertino, CA (US)

(72) Inventors: Bob Bradley, San Jose, CA (US); William M. Bumgarner, San Jose, CA (US); Vijay Sundaram, San Ramon, CA (US); Marc J. Krochmal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 17/103,883

(22) Filed: Nov. 24, 2020

(65) Prior Publication Data

US 2021/0081522 A1    Mar. 18, 2021

Related U.S. Application Data

(62) Division of application No. 15/805,034, filed on Nov. 6, 2017, now Pat. No. 10,853,471.

(Continued)

(51) Int. Cl.
*G06F 21/44*    (2013.01)
*G06F 21/60*    (2013.01)
(Continued)

(52) U.S. Cl.
CPC ............ *G06F 21/44* (2013.01); *G06F 21/604* (2013.01); *H04L 9/32* (2013.01); *H04L 9/3247* (2013.01);
(Continued)

(58) Field of Classification Search
CPC ......... G06F 21/44; G06F 21/604; H04L 9/32; H04L 9/3247; H04L 63/0876;
(Continued)

(56) References Cited

U.S. PATENT DOCUMENTS 8,146,142 B2 * 3/2012 Lortz .................... H04L 63/105
726/26
8,583,915 B1 * 11/2013 Huang .................. H04L 9/3271
726/6

(Continued)

FOREIGN PATENT DOCUMENTS

CN    101341718 A    1/2009
CN    103188458 A    7/2013
(Continued)

OTHER PUBLICATIONS

Chinese Patent Application No. 201880006916.4—First Office Action dated Jan. 12, 2021, 22 pages.

(Continued)

*Primary Examiner* — J. Brant Murphy
(74) *Attorney, Agent, or Firm* — Dickinson Wright RLLP

(57) ABSTRACT

Disclosed herein is a technique for managing permissions associated with the control of a host device that are provided to a group of wireless devices. The host device is configured to pair with a first wireless device. In response to pairing with the first wireless device, the host device grants a first level of permissions for controlling the host device to the first wireless device. Subsequently, the host device can receive a second request from a second wireless device to pair with the host device. In response to pairing with the second wireless device, the host device can grant a second level of permissions for controlling the host device to second wireless device, where the second level of permissions is distinct from the first level of permissions.

20 Claims, 13 Drawing Sheets

Related U.S. Application Data

(60) Provisional application No. 62/514,871, filed on Jun. 4, 2017, provisional application No. 62/449,582, filed on Jan. 23, 2017, provisional application No. 62/446,521, filed on Jan. 15, 2017.

(51) Int. Cl.

| | | |
|---|---|---|
| *H04W 4/00* | (2018.01) | |
| *H04L 9/32* | (2006.01) | |
| *H04W 12/02* | (2009.01) | |
| *H04W 12/03* | (2021.01) | |
| *H04W 12/50* | (2021.01) | |
| *H04W 12/065* | (2021.01) | |
| *H04W 12/06* | (2021.01) | |
| *H04W 12/069* | (2021.01) | |
| *H04W 12/082* | (2021.01) | |
| *H04W 12/084* | (2021.01) | |
| *H04L 65/61* | (2022.01) | |
| *H04W 76/14* | (2018.01) | |
| *H04L 9/40* | (2022.01) | |
| *H04W 84/12* | (2009.01) | |
| *H04W 4/80* | (2018.01) | |
| *H04W 4/06* | (2009.01) | |
| *H04W 12/55* | (2021.01) | |
| *H04W 12/71* | (2021.01) | |

(52) U.S. Cl.
CPC .......... *H04L 63/0876* (2013.01); *H04L 65/61* (2022.05); *H04W 4/00* (2013.01); *H04W 12/02* (2013.01); *H04W 12/03* (2021.01); *H04W 12/065* (2021.01); *H04W 12/068* (2021.01); *H04W 12/069* (2021.01); *H04W 12/082* (2021.01); *H04W 12/084* (2021.01); *H04W 12/50* (2021.01); *H04W 76/14* (2018.02); *H04L 63/083* (2013.01); *H04L 63/10* (2013.01); *H04L 63/105* (2013.01); *H04W 4/06* (2013.01); *H04W 4/80* (2018.02); *H04W 12/55* (2021.01); *H04W 12/71* (2021.01); *H04W 84/12* (2013.01)

(58) Field of Classification Search
CPC ....... H04L 65/61; H04L 63/083; H04L 63/10; H04L 63/105; H04W 4/00; H04W 12/02; H04W 12/03; H04W 12/065; H04W 12/068; H04W 12/069; H04W 12/082; H04W 12/084; H04W 12/50; H04W 76/14; H04W 4/06; H04W 4/80; H04W 12/55; H04W 12/71; H04W 84/12; H04N 21/43615; H04N 21/43637; H04N 21/4185; H04N 21/4751; H04N 21/47815
See application file for complete search history.

(56) References Cited

U.S. PATENT DOCUMENTS

| | | | | |
|---|---|---|---|---|
| 9,031,050 | B2* | 5/2015 | Cherian | H04W 76/14 370/338 |
| 9,372,823 | B1* | 6/2016 | Cope | H04W 12/082 |
| 9,398,089 | B2* | 7/2016 | Sheth | H04L 67/1095 |
| 10,142,668 | B1* | 11/2018 | Nijim | H04N 21/41407 |
| 2004/0064604 | A1* | 4/2004 | Cox | H04L 63/10 710/36 |
| 2007/0150918 | A1* | 6/2007 | Carpenter | G06F 21/10 348/E7.061 |
| 2009/0125971 | A1* | 5/2009 | Belz | H04N 7/163 725/153 |
| 2009/0270036 | A1* | 10/2009 | Michaud | H04W 12/062 455/41.3 |
| 2010/0162370 | A1* | 6/2010 | Altay | H04L 63/0823 455/418 |
| 2012/0297490 | A1* | 11/2012 | Barraclough | H04L 65/61 726/26 |
| 2012/0299847 | A1* | 11/2012 | Kwon | G06F 9/441 345/173 |
| 2013/0139197 | A1* | 5/2013 | Belz | H04N 21/44231 725/25 |
| 2013/0169672 | A1* | 7/2013 | Kim | B60K 35/00 345/619 |
| 2013/0185761 | A1* | 7/2013 | Friel | H04N 17/00 725/139 |
| 2013/0190046 | A1* | 7/2013 | Noh | H04M 1/72409 455/556.1 |
| 2013/0305319 | A1* | 11/2013 | Matthews, III | H04W 12/08 726/4 |
| 2014/0010211 | A1* | 1/2014 | Asterjadhi | H04W 74/06 370/336 |
| 2014/0068725 | A1* | 3/2014 | Zhang | H04W 12/06 726/5 |
| 2014/0165176 | A1* | 6/2014 | Ow | H04L 63/0815 726/8 |
| 2014/0213181 | A1* | 7/2014 | Rosenberg | H04B 5/0056 455/41.1 |
| 2014/0282825 | A1* | 9/2014 | Bitran | G06F 21/00 726/1 |
| 2014/0330951 | A1* | 11/2014 | Sukoff | H04L 12/2818 709/223 |
| 2014/0337041 | A1* | 11/2014 | Madden | G16H 20/00 705/2 |
| 2014/0364056 | A1* | 12/2014 | Belk | H04W 4/00 455/41.1 |
| 2015/0149358 | A1* | 5/2015 | Robbin | G06Q 50/01 705/35 |
| 2015/0365787 | A1* | 12/2015 | Farrell | H04W 4/02 455/456.1 |
| 2015/0373479 | A1* | 12/2015 | Xia | H04M 1/72454 455/420 |
| 2016/0112429 | A1* | 4/2016 | Sundaresan | H04L 63/08 726/4 |
| 2016/0182507 | A1* | 6/2016 | Zhang | H04L 63/0861 726/7 |
| 2016/0309532 | A1* | 10/2016 | Yu | H04W 4/21 |
| 2016/0344735 | A1* | 11/2016 | Blinn | H04L 9/40 |
| 2016/0360018 | A1* | 12/2016 | Watson | H04W 72/566 |
| 2017/0105037 | A1* | 4/2017 | Svendsen | H04N 21/2143 |
| 2017/0126586 | A1* | 5/2017 | Chen | H04L 63/0876 |
| 2017/0272316 | A1* | 9/2017 | Johnson | H04L 61/301 |
| 2017/0289807 | A1* | 10/2017 | Mendonca | H04N 21/41407 |
| 2018/0007013 | A1* | 1/2018 | Wang | H04N 21/2347 |
| 2018/0206122 | A1 | 7/2018 | Bradley et al. | |
| 2021/0326459 | A1* | 10/2021 | Chivukula | H04L 9/3226 |
| 2023/0081318 | A1* | 3/2023 | Sigurdsson | G06F 21/36 726/4 |

FOREIGN PATENT DOCUMENTS

| | | |
|---|---|---|
| CN | 103220554 A | 7/2013 |
| CN | 103260070 A | 8/2013 |
| KR | 2008-0028198 A | 3/2008 |

OTHER PUBLICATIONS

PCT Patent Application No. PCT/US2018/012813—International Search Report and Written Opinion dated May 10, 2018.

* cited by examiner

MANAGING PERMISSIONS FOR DIFFERENT WIRELESS DEVICES TO CONTROL A COMMON HOST DEVICE

CROSS-REFERENCE TO RELATED APPLICATIONS

The present application is a Divisional of U.S. patent application Ser. No. 15/805,034, entitled "MANAGING PERMISSIONS FOR DIFFERENT WIRELESS DEVICES TO CONTROL A COMMON HOST DEVICE," filed Nov. 6, 2017, set to issue as U.S. Pat. No. 10,853,471 on Dec. 1, 2020, which claims the benefit of U.S. Provisional Application No. 62/446,521, entitled "MANAGING PERMISSIONS FOR DIFFERENT WIRELESS DEVICES TO CONTROL A COMMON HOST DEVICE," filed Jan. 15, 2017, and U.S. Provisional Application No. 62/449,582, entitled "MANAGING PERMISSIONS FOR DIFFERENT WIRELESS DEVICES TO CONTROL A COMMON HOST DEVICE," filed Jan. 23, 2017, and U.S. Provisional Application No. 62/514,871, entitled "MANAGING PERMISSIONS FOR DIFFERENT WIRELESS DEVICES TO CONTROL A COMMON HOST DEVICE," filed Jun. 4, 2017, the content of which is incorporated herein by reference in its entirety for all purposes.

FIELD OF INVENTION

The embodiments described herein set forth a technique for managing permissions associated with the control of a host device (e.g., a set-top box) that are provided to a group of wireless devices.

BACKGROUND

Wireless devices (e.g., smart phones, tablets, wearables, etc.) are commonly being used to broadcast content to auxiliary displays (e.g., "smart" televisions), or set-top boxes that are connected to such auxiliary displays. A common use-case scenario involves a user loading a slideshow presentation onto their smart phone, connecting their smart phone to a set-top box using a network-based interface, and then causing the smart phone to output the slideshow presentation to an auxiliary display (e.g., via a set-top box). One example of a network-based interface includes Apple's® AirPlay®, which enables AirPlay®-equipped portable computing devices (e.g., iOS-based devices such as an iPhone®, an iPad®, an Apple Watch®, etc.) to broadcast content to AirPlay®-equipped components (e.g., an Apple TV®).

In most cases, an owner of a set-top box can allow different wireless devices to wirelessly broadcast content to the set-top box without being concerned about the overall security surrounding the operation of the set-top box. However, as set-top boxes and wireless devices become more sophisticated—and additional features are developed that enable the wireless devices to control the set-top boxes in new and enhanced ways—security issues will also increase. In that regard, it is desirable to limit the permissions assigned to some wireless devices while increasing the permissions assigned to other wireless devices to ensure that the set-top boxes operate in a secure and intended manner.

SUMMARY OF INVENTION

Accordingly, representative embodiments set forth herein disclose various techniques for managing permissions for controlling a host device (e.g., a set-top box), where different permissions can be assigned to different wireless devices/user accounts associated with the different wireless devices.

One embodiment sets forth a method implemented by a host device for managing permissions associated with the control of the host device by different wireless devices. According to some embodiments, the host device receives a first request from a first wireless device to wirelessly pair with the host device. In response to the first request, the host device can establish a first wireless connection (i.e., pair with) with the first wireless device. In conjunction with establishing the first wireless connection, the host device can grant a first level of permissions for controlling the host device to the first wireless device. Subsequently, the host device can receive a second request from a second wireless device to wirelessly pair with the host device. In response to the second request, the host device can establish a second wireless connection with the second wireless device. In conjunction with establishing the second wireless connection, the host device can grant a second level of permissions for controlling the host device to second wireless device, where the second level of permissions can be distinct from the first level of permissions.

Another embodiment sets forth a method for establishing a secure communication channel between a host device and a wireless device while promoting anonymity of the wireless device. According to some embodiments, the method involves the host device receiving a request from the wireless device to wirelessly pair with the host device. In response to the request, the host device can establish a wireless connection with the wireless device. The method can further include the host device receiving, from the wireless device, i) a first message encrypted with a private key associated with the wireless device, and ii) a corresponding public key to the private key. The host device can store the public key in a depository of public keys (received from/associated with other wireless devices). Subsequently, the host device can receive a second message from the wireless device, where the second message is also encrypted with the private key, but does not include identifying information associated with the wireless device (e.g., the public key, unique identifiers associated with the wireless device, etc.). The host device can then determine that the second message is associated with the wireless device by i) attempting to perform a decryption of the second message using each public key in the depository of public keys, and ii) identifying the public key that successfully decrypts the second message. In this manner, the host device and the wireless device can establish the secure connection while suppressing information of the wireless device that might otherwise be obtainable by snooping/malicious devices, thereby enhancing overall security.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
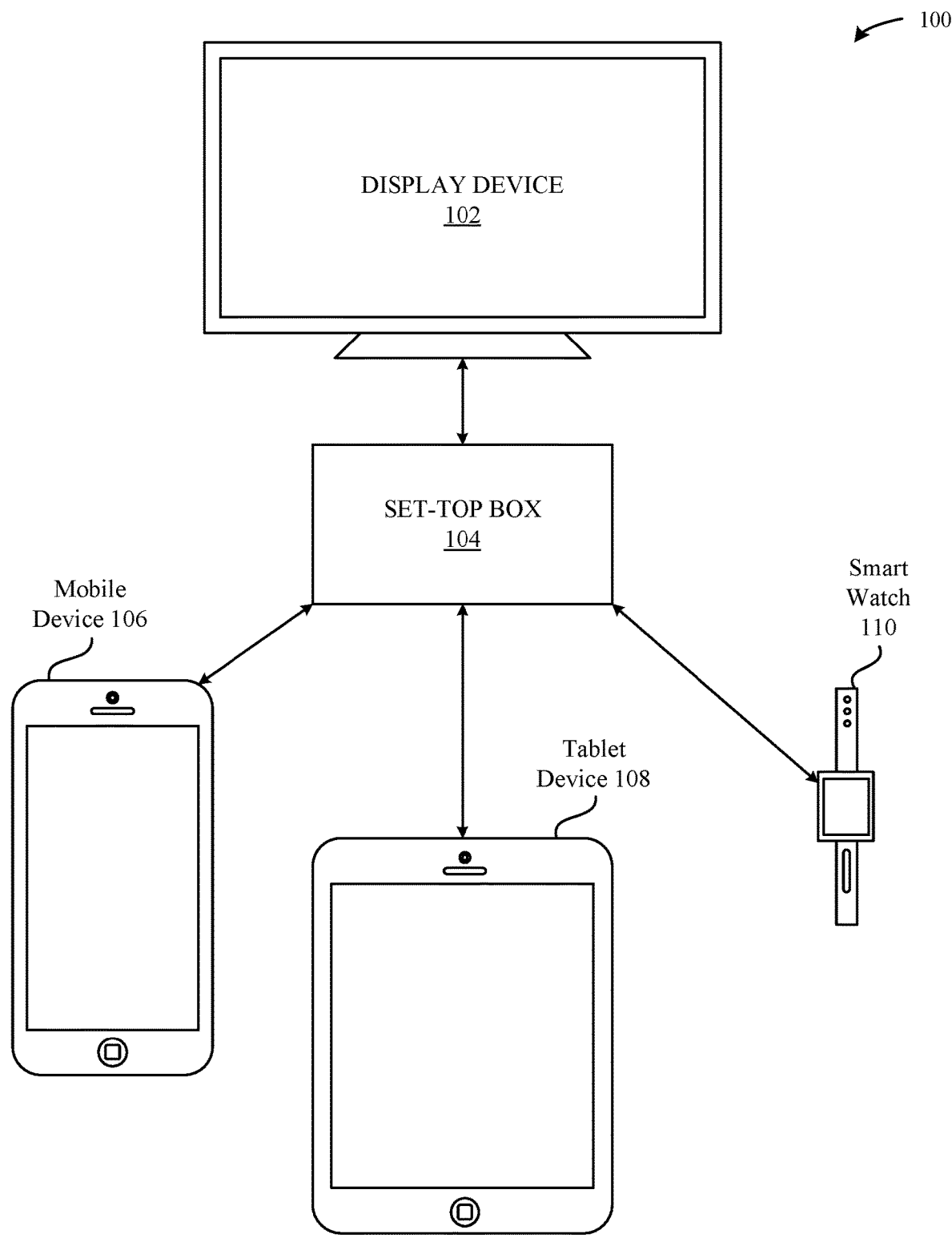
FIG. 1 illustrates a system including different computing devices that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Representative embodiments described herein set forth a technique for managing permissions assigned to wireless devices for controlling a host device. According to some embodiments, the host device can be configured to communicate with any number of wireless devices, either through a direct connection (e.g., a local wireless connection or a local wired connection) or through an indirect connection (e.g., the Internet). One example of a direct-connection scenario can involve the host device receiving a request from a wireless device to establish a wireless connection between the host device and the wireless device. Once wirelessly connected, the host device can grant permissions to the wireless device that specify how the wireless device is able to control the host device. For example, default permissions can be granted to the wireless device upon a successful pairing with the host device, where the default permissions enable the wireless device to stream content to the host device and remotely navigate a user interface (UI) of the host device. In another example, administrative permissions can be granted to the wireless device, where the administrative permissions permit the wireless device to cause the host device to perform heightened activity (e.g., managing permissions associated with other wireless devices, authorizing payments, unlocking the host device for operation, approving content for playback at the host device, and so on). As additional wireless devices are paired with the host device, the host device can grant additional permissions to those wireless devices, and can add or subtract from those permissions in accordance with the selections made by user accounts/wireless devices possessing administrative-level permissions.

Representative embodiments described herein also set forth a technique for enabling the host device to establish a secure connection with a wireless device in a manner that promotes anonymity to enhance overall security. According to some embodiments, the host device can receive a request to establish a secure connection with a wireless device. To establish the secure connection, the wireless device provides—e.g., during an initial pairing process—i) a first message to the host device, where the first message is encrypted with a private key possessed by the wireless device, and ii) a corresponding public key to the private key. In turn, the host device can store the public key in a depository of public keys (associated with different wireless devices with which the host device has previously paired). Subsequently—e.g., when the wireless device returns into proximity with the host device at a later time—the wireless device provides a second message to the host device, where the second message is also encrypted with the private key, but does not include information associated with the wireless device that uniquely identifies the wireless device (e.g., the public key, a unique software-based/hardware-based identifier, etc.). In turn, the host device can determine that the second message is associated with the first wireless device by i) attempting to perform a decryption of the second message using each public key in the depository of public keys, and ii) identifying the public key that successfully decrypts the second message. In this manner, the host device and the wireless device can establish the secure connection while suppressing identifying information of the wireless device that might otherwise be obtainable by snooping/malicious devices, thereby enhancing overall security.

Accordingly, the techniques set forth herein enable a highly flexible environment in which the permissions associated with the set-top box and assigned to various wireless devices can be modified to provide intended functionality while maintaining security. A more detailed description of these techniques is provided below in conjunction with FIGS. 1-7.

FIG. 1 illustrates a system 100 of different computing devices that can be configured to perform the various techniques described herein. As shown in FIG. 1, the system 100 includes a display device 102, a set-top box 104, a mobile device 106, a tablet device 108, and a wearable device 110. It is noted that throughout this disclosure, each of the mobile device 106, tablet device 108, and wearable device 110 are collectively referred to herein as "wireless devices." Moreover, it is noted that throughout this disclosure, the terms "host device" and "set-top box" are used interchangeably to describe any computing device that manages the permissions assigned to various wireless devices for controlling the computing device.

As depicted in FIG. 1, set-top box 104 can be a standalone device. However, it should be understood that set-top box 104 can also be integrated into another device, such as display device 102. Display device 102 can be any conventional display device such as a monitor, television, or the like. Display device 102 can be communicatively connected to set-top box 104 using any suitable communication protocol whether through a wired or wireless connection. According to some embodiments, display device 102 can be configured to interface with set-top box 104 and display a user interface (UI) generated by the set-top box 104 and provided to the display device 102. Display device 102 displays content generated at the set-top box 104.

According to some embodiments, each of the set-top box 104, mobile device 106, tablet device 108, and wearable device 110 are configured to execute respective software applications that enable these devices to carry out the various techniques described herein. For example, the mobile device 106, tablet device 108, and wearable device 110 can be configured to execute a software application (e.g., Apple TV® Remote) that enables these wireless devices to remotely navigate a user interface of a software application (e.g., an operating system (OS)) being executed on the set-top box 104 (e.g., Apple TV®). Moreover, each of the wireless devices can be configured to enable home automation techniques. For example, the mobile device 106 can be configured to control an external device that is associated with the set-top box 104 through a home automation network (e.g., HomeKit by Apple®). Notably, and although not illustrated in FIG. 1, it is well-understood that these computing devices can include various hardware components that enable the execution of the respective applications. For example, these devices can include at least one storage device (e.g., a solid-state drive, a hard drive, etc.), at least one processor (e.g., a multi-core central processing unit (CPU)), and at least one memory (e.g., a random-access memory (RAM)) into which an OS can be executed, where the OS can be configured to load/execute different applications.

According to some embodiments, and as previously described herein, the set-top box 104 can be configured to grant specific permissions to a wireless device (e.g., one of mobile device 106, tablet device 108, or wearable device 110) that allow the wireless device to control different functionalities provided by the set-top box 104. For example, specific permissions that can be granted to a wireless device can include, but are not limited to, streaming content to the set-top box 104, performing payments for content (e.g., movies, TV shows, music, etc.) accessible to the set-top box 104, navigating user interfaces of the set-top box 104, accessing parental controls of the set-top box 104, changing configuration settings of the set-top box 104, unlocking the set-top box 104, and the like. In some embodiments, unlocking set-top box 104 can enable a user operating a wireless device to access a specific set of functionalities provided by the set-top box 104. More specifically, certain functionalities of the set-top box 104 can be denied to the wireless device when the set-top box 104 is locked and the wireless device is not assigned permissions for unlocking the set-top box 104. However, in some embodiments, certain functionalities of the set-top box 104—e.g., default, low-security functions—can be accessible to wireless devices without requiring the set-top box 104 to be unlocked. For example, all wireless devices can be permitted to stream content to the set-top box 104 without requiring an unlocking of the set-top box 104.

Additionally, the set-top box 104 can be configured to grant functionalities to paired wireless devices in accordance with a user account associated with (e.g., logged into) the set-top box 104. According to some embodiments, a user account can be associated with payment information, configuration settings, parental controls, cryptographic operation information (e.g., keys used to encrypt/decrypt messages), etc., that are specific to the user account. According to some embodiments, the set top box 104 can, at the direction of the administrator, grant permissions to a wireless device currently paired with the set-top box 104 to utilize one or more functionalities associated with a specific user account. Consider, for example, a scenario in which a parent's user account is currently logged into the set-top box 104, where the user account is associated with the parent's payment credentials (e.g., a family credit card). In this scenario, the set-top box 104 can, with the parent's permission, grant permissions to a child to purchase movies using the parent's user account (i.e., the payment credentials associated therewith). In another scenario, when a parent unlocks the set-top box 104 using a biometric authentication (e.g., locally or remotely to the set-top box 104 via a wireless device), the set-top box 104 can provide functionalities permissioned to the parent when another user (e.g., a child) is operating the set-top box 104. In this manner, the child can gain access to functionalities that are specific to the parent's user account, where such functionalities can be removed at the parent's discretion. In yet another scenario, several members of a family can be using the set-top box 104 while the set-top box 104 is logged into the parent's user account. In this example, if the family is performing a search query for a movie, a drop-down menu or keyboard—which is permitted in accordance with permissions assigned to the parent's user account—can be provided by the set-top box 104 to each of the paired wireless devices to allow different family members to provide input. In this manner, each family member can access the same functionality that is accessible through the parent's user account. Moreover, because each of these functionalities can be provided in accordance with a single user account, each device that is interacting with the set-top box 104 can do so using cryptographic information (e.g., a cryptographic signature) associated with the user account.

It is noted that the embodiments described herein involve associating different levels of permissions with different wireless devices. However, it is noted that such permissions can be specifically associated with users/user accounts configured on/associated with the wireless devices to enhance the overall flexibility of the system 100. For example, a particular user can be associated with each of the mobile device 106, tablet device 108, and wearable device 110 through a common user account (e.g., a username/password combination associated with a cloud service). By using a common account, multiple wireless devices can share passwords (e.g., via an iCloud Keychain), share cryptographic information (e.g., sharing cryptographic keys), share payment information (e.g., via Apple Pay), and the like. In this example, when a user pairs a mobile device 106 with the set-top box 104 and receives a first level of permissions—either as a result of the pairing or by being granted heightened permissions by an administrator—those permissions are associated with the user account irrespective of the wireless device that is being used to perform the function. In this manner, the user is permitted to access the same functionalities of the set-top box 104 from his/her different wireless devices, which can enhance the user's overall experience.

Additionally, and although not illustrated in FIG. 1, it is well-understood that mobile device 106, tablet device 108, and wearable device 110 merely are examples of computing devices that can be configured to interface with the set-top box 104. Additionally, it is noted that although the different computing devices discussed herein are illustrated in a singular form in FIG. 1, the embodiments set forth herein are not so limited. For example, system 100 can include multiple display devices 102, set-top boxes 104, mobile devices 106, tablet devices 108, wearable devices 110, and the like, that are configured to implement the techniques described herein.

Accordingly, FIG. 1 sets forth an example system 100 that includes different computing devices configured to perform the various techniques described herein. A more detailed explanation of these various techniques is provided below in conjunction with FIGS. 2A-2C, 3A-3B, 4A-4B, and 5A-5B.

Figure 2A:
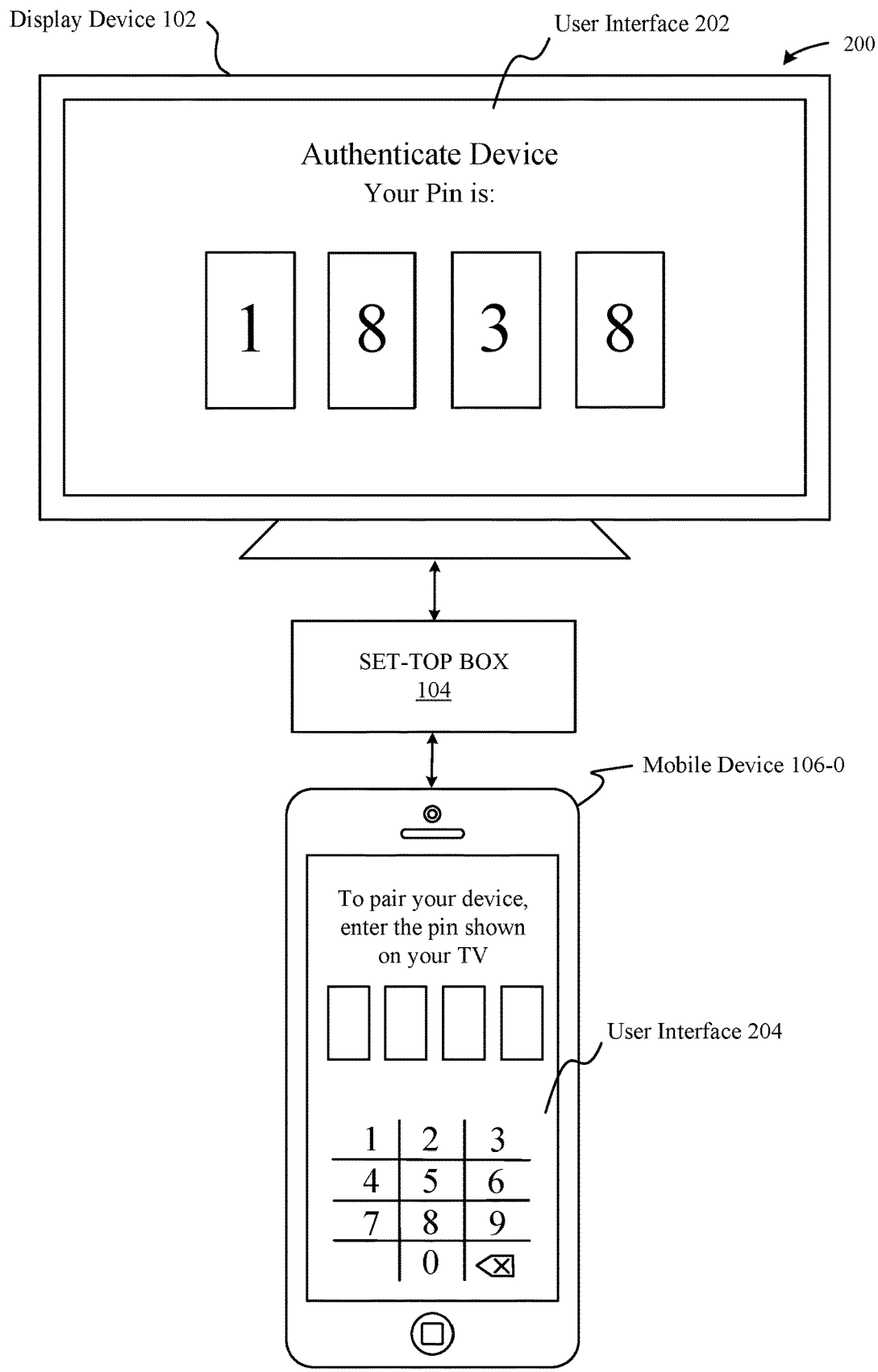
FIG. 2A illustrates a conceptual diagram of a mobile device pairing with a set-top box, according to some embodiments.

FIG. 2A illustrates a conceptual diagram 200 of a mobile device 106-0 pairing with a set-top box 104, according to some embodiments. According to some embodiments, when the mobile device 106-0 is within range to establish a direct communication channel (e.g., via Bluetooth®, Wi-Fi, Near Field Communication "NFC", etc.) with the set-top box 104, the mobile device 106-0 and/or set-top box 104 can initiate a pairing process. According to some embodiments, the pairing process can involve forming a secure communication channel according to the techniques illustrated in FIG. 2C and described below in greater detail.

In some embodiments, the set-top box 104 can be configured to authenticate the mobile device 106-0 before pairing with the mobile device 106-0. For example, the authentication can be performed to ensure that an operator of the mobile device 106-0 is in proximity to the set-top box 104 and/or has access to the display device 102 to which the set-top box 104 is connected. For example, the set-top box 104 can authenticate the mobile device 106-0 by requiring a PIN number displayed on the display device 102 to be entered on the mobile device 106-0 in accordance with the user interface 202 and user interface 204 depicted in FIG. 2A. According to some embodiments, the PIN number can be randomly generated by the set-top box 104 and displayed via the display device 102. For example, as illustrated in FIG. 2A, the set-top box 104 can authenticate the mobile device 106-0 when the PIN number "1838" (being displayed on display device 102) is successfully input at the mobile device 106-0 and provided to the set-top box 104. In some embodiments, the randomly generated PIN number that is used to authenticate the mobile device 106-0 can be used as a seed to cryptographically establish a secure communication channel between the set-top box 104 and mobile device 106-0. It is noted that additional forms of authentication can be used to carry the functionalities provided herein. For example, biometric authentication (e.g., face recognition, iris recognition, fingerprint recognition, etc.) can be used to replace or supplement the PIN-based techniques described above.

Once the mobile device 106-0 is paired to the set-top box 104, a particular level of permissions can be granted to the mobile device 106-0/the user account associated with the mobile device 106-0. According to some embodiments, a level of permissions refers to a dynamic set of permissions for controlling functionalities of the set-top box 104, where the dynamic set of permissions can be modified by way of the set-top box 104 and/or wireless devices known to the set-top box 104 (e.g., having administrative privileges), as described in greater detail herein. In one example, upon pairing with the set-top box 104, the mobile device 106-0 can be granted a level of permissions that allows the mobile device 106-0 to control a limited number of functions provided by the set-top box 104. As will be described with reference to FIGS. 3A-3B, additional levels of permissions can be granted to the mobile device 106-0 to increase the level of functions that the set-top box 104 can perform while paired with the mobile device 106-0.

Notably, and according to some embodiments, it is not necessary for the mobile device 106-0 to be paired with the set-top box 104 prior to the set-top box 104 granting the mobile device 106-0 the level of permissions. In particular, and according to some embodiments, permissions for mobile devices 106 can be pre-assigned prior to pairing with the set-top box 104. In one example, an administrator known to the set-top box 104—e.g., a parent of a household—can reference mobile devices 106 that are linked to the parent (e.g., via different user accounts associated with the parent/mobile devices 106), and specify levels of permissions to be automatically assigned to the mobile devices 106 when they eventually pair with the set-top box 104. For example, when a child pairs his/her mobile device 106-0 with the set-top box 104, the mobile device 106-0 can be permitted—based on previous permissions selected by the child's parent—to view previously-purchased content, but restricted from purchasing/renting new content. In this manner, permissions can be flexibly assigned within households without requiring an upfront pairing of all mobile devices 106, which might otherwise be inconvenient to accomplish.

Figure 2B:
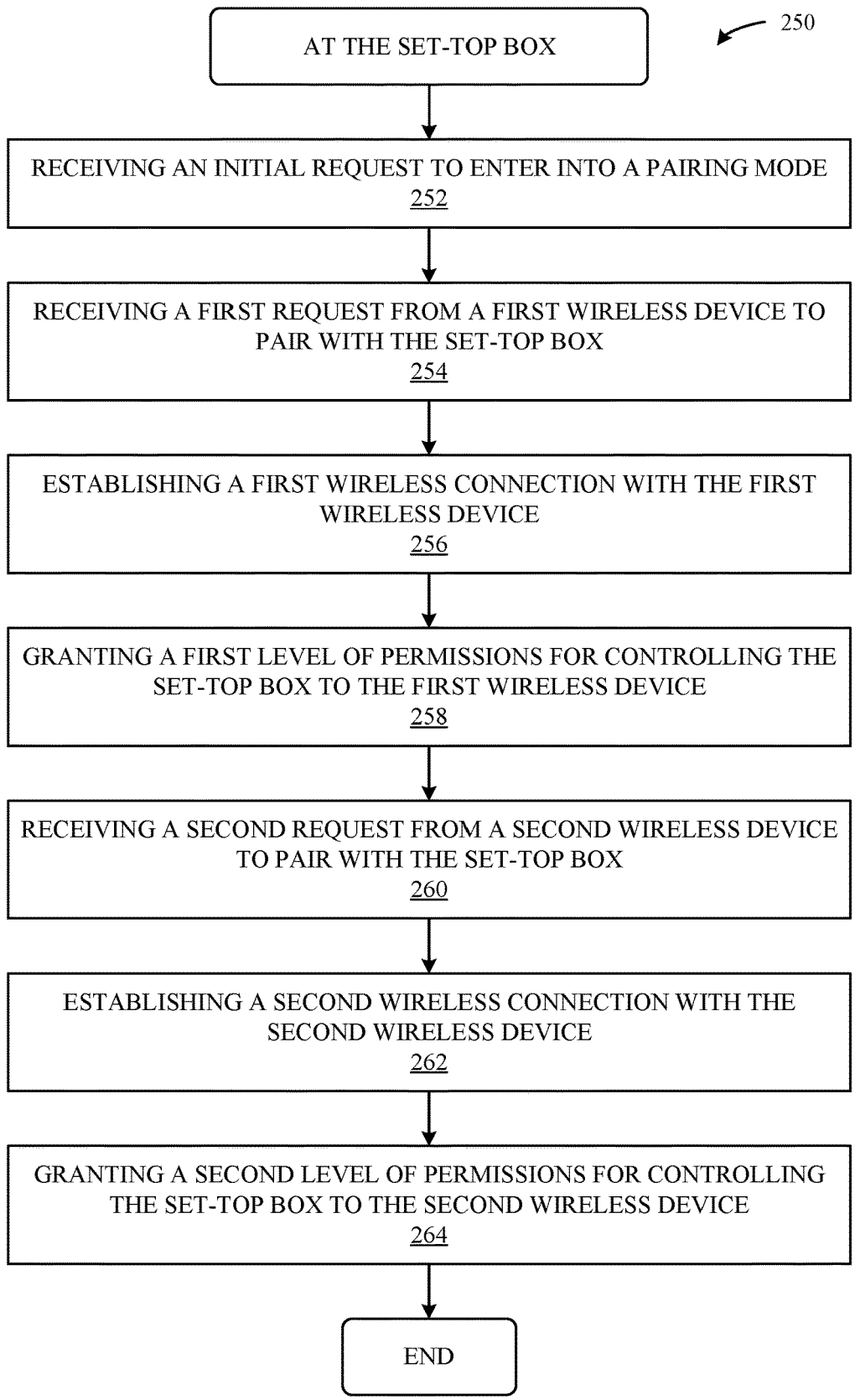
FIG. 2B illustrates a method for enabling a set-top box to pair with wireless devices and manage permissions assigned to the wireless devices associated with controlling the set-top box, according to some embodiments.

FIG. 2B illustrates a method 250 for enabling the set-top box 104 to pair with wireless devices and manage permissions assigned to the wireless devices associated with controlling the set-top box 104, according to some embodiments. As shown in FIG. 2B, the method 250 begins at step 252, where the set-top box 104 receives an initial request to enter into a pairing mode. In some embodiments, the initial request to enter into the pairing mode can be initiated through a remote control of the set-top box 104 (e.g., used to navigate a settings UI of the set-top box 104), through a wireless device capable of communicating with the set-top box 104 (e.g., via a direct or an indirect connection), and so on. At step 254, the set-top box 104 receives a first request from a first wireless device to pair with the set-top box 104. In response, at step 256, the set-top box 104 can establish a first wireless connection—i.e., pair—with the first wireless device, e.g., through a Bluetooth connection, an NFC connection, and the like.

In response to the first wireless device successfully pairing with the set-top box 104, at step 258, the set-top box 104 can grant the first wireless device a first level of permissions for controlling the set-top box 104. In one example, the pairing between the first wireless device and the set-top box 104 can be the performed during an initial setup of the set-top box 104. To further illustrate this example, the set-top box 104 can consider the first wireless device to be an administrator because the pairing occurred during the initial setup of the set-top box 104, or because the first wireless device is the first (i.e., only) wireless device to pair with the set-top box 104. In one example, the first level of permissions can include authorizing payments, unlocking the set-top box 104 for operation, approving content (e.g., videos, audio, or other media) for playback at the set-top box 104, changing parental controls, changing configuration settings, accessing confidential information (e.g., financial information), and the like. In another example, the first wireless device, as an administrator, obtains the authority to manage the specific permissions assigned to wireless devices that subsequently become known to the set-top box 104. For example, the first wireless device/user account associated with the first wireless device can be permitted to assign administrative privileges to some wireless devices known to the set-top box 104, or more restrictive privileges to the other wireless devices known to the set-top box 104.

For example, at step 260, the set-top box 104 receives a second request from a second wireless device to pair with the set-top box 104. In response, at step 262, the set-top box 104 can establish a second wireless connection with the second wireless device. In conjunction with establishing the second wireless connection, at step 264, the set-top box 104 can grant a second level of permissions to the second wireless device for controlling the set-top box 104. In some embodiments, the second level of permissions is distinct from the first level of permissions, e.g., based on instructions received from the first wireless device, based on settings of the set-top box 104 (e.g., to automatically assign restricted permissions to all secondary wireless devices), and so on.

According to some embodiments, the second level of permissions that can be granted by the set-top box 104 are associated with functions of the set-top box 104 that do not pose a significant risk of compromising the security of the set-top box 104. The second level of permissions can include, for example, permitting the second wireless device to stream content to the set-top box 104. After the initial pairing and granting of the second level of permissions, an administrator known to the set-top box 104 (e.g., associated with the first wireless device, in accordance with the foregoing examples) can grant an additional level of permissions to the second wireless device. For example, in order for the second wireless device to rent content through the set-top box 104, the second wireless device may require a higher level of permissions. In some embodiments, the set-top box 104 can query the administrator (or other administrators) to approve assigning the higher level of permissions to the second wireless device, as described in greater detail below with reference to FIG. 3A.

Figure 2C:
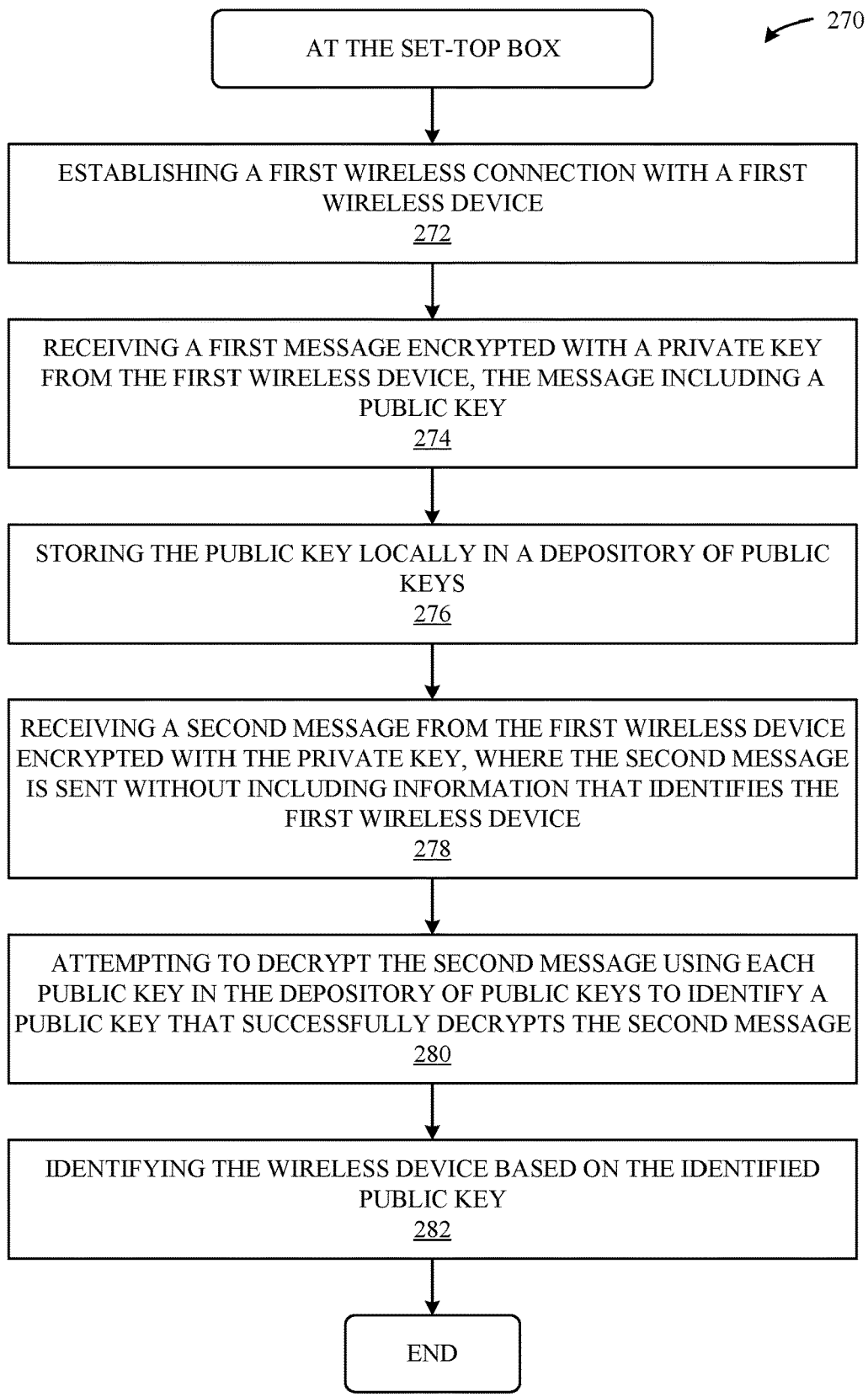
FIG. 2C illustrates a method for establishing a trusted connection between a set-top box and a wireless device while promoting anonymity of the wireless device, according to some embodiments.

FIG. 2C illustrates a method 270 for establishing a trusted connection between the set-top box 104 and a wireless device while promoting anonymity of the wireless device, according to some embodiments. As shown in FIG. 2C, the method 270 begins at step 272, where the set-top box 104 establishes a first wireless connection with a first wireless device. In some embodiments, the first wireless connection occurs during an initial pairing, e.g., when the first wireless device and the set-top box 104 pair for the first time. During this initial pairing, the first wireless device can be authenticated using a randomly generated PIN number (e.g., as described above in conjunction with FIG. 2A). Moreover, and as previously described herein, the randomly generated PIN number used to authenticate the first wireless device can function as a seed to cryptographically establish a secure communication channel between the set-top box 104 and the first wireless device. In this manner, subsequent messages passed between the set-top box 104 and the first wireless device—e.g., those described below in conjunction with steps 274-282—can be communicated over the secure communication channel.

At step 274, the set-top box 104 receives a first message encrypted with a private key from the first wireless device over the secure communication channel. In some embodiments, the first wireless device encrypts the first message in accordance with a public-key cryptography scheme. For example, the first wireless device can encrypt the first message using a private key that is possessed only by the first wireless device. Thereafter, the first message can be transmitted over the secure communications channel, where the first message is accompanied with a corresponding public key (to the private key) that can be used by the set-top box 104 to decrypt the first message without exposing the private key to the set-top box 104.

At step 276, the set-top box 104 can store the public key in a depository of public keys (e.g., stored in a storage device accessible to the set-top box 104). According to some embodiments, the depository of public keys can include every public key that has been previously and currently shared with the set-top box 104, e.g., different public keys provided to the set-top box 104 during pairing processes conducted with other wireless devices. In some embodiments, the set-top box 104 can selectively store the public keys of wireless devices that have successfully paired with the set-top box 104, while disregarding the public keys of wireless devices that did not successfully pair with the set-top box 104, thereby enhancing overall efficiency.

At step 278, the set-top box 104 receives a second message from the first wireless device, where the second message is encrypted with the private key. According to some embodiments, the second message can be provided by the first wireless device at a subsequent time, e.g., after the first wireless device disconnects from the set-top box 104 (e.g., when a user leaves his/her house), and then attempts to reconnect to the set-top box 104 (e.g., when the user returns home). In some embodiments, the second message is sent from the first wireless device to the set-top box 104 without identifying information associated with the first wireless device, e.g., the public key associated with the first wireless device, a unique identifier associated with the first wireless device (e.g., a serial number of the first wireless device, a unique ID of a user account associated with the first wireless device, etc.). In this manner, the second message lacks identifying information that could otherwise be used to track messages sent from the first wireless device, e.g., by a malicious device that is attempting to snoop incoming/outgoing communications associated with the set-top box 104.

At step 280, the set-top box 104 attempts to decrypt the second message using each public key in the depository of public keys to identify a public key that successfully decrypts the second message. More specifically, any public key that does not correspond to the private key that was used to encrypt the second message will not successfully decrypt the second message, which effectively enables the set-top box 104 to identify the appropriate corresponding public key—and, transitively, the first wireless device—through a process of elimination. Accordingly, when the set-top box 104 identifies a public key that successfully decrypts the second message, the set-top box 104 can then associate the second message with the wireless device that initially provided the identified public key, which is carried out at step 282.

Accordingly, FIG. 2C provides a technique that enables wireless devices to establish secure communication channels with the set-top box 104 without revealing sensitive information about the wireless devices that can potentially be collected by snooping/malicious devices. Again, to achieve this benefit, the set-top box 104 receives a message encrypted with a private key from a wireless device, and attempts to decrypt the encrypted message with the different public keys—those retained by the set-top box 104 during initial pairings—to identify whether the wireless device is known to the set-top box 104. Using this approach, when the set-top box 104 is able to decrypt the encrypted message using a particular public key, the wireless device can be identified based on the particular public key and authenticated. Conversely, when the set-top box 104 is unable to decrypt the message, the wireless device cannot be identified, and is not authenticated.

Accordingly, FIGS. 1 and 2A-2C set forth embodiments in which the set-top box 104 is able to pair with multiple wireless devices and manage the permissions associated with those wireless devices. A more detailed breakdown and various examples of how these permissions can be managed is provided below in conjunction with FIGS. 3A-3B, 4A-4B, and 5A-5B.

Figure 3A:
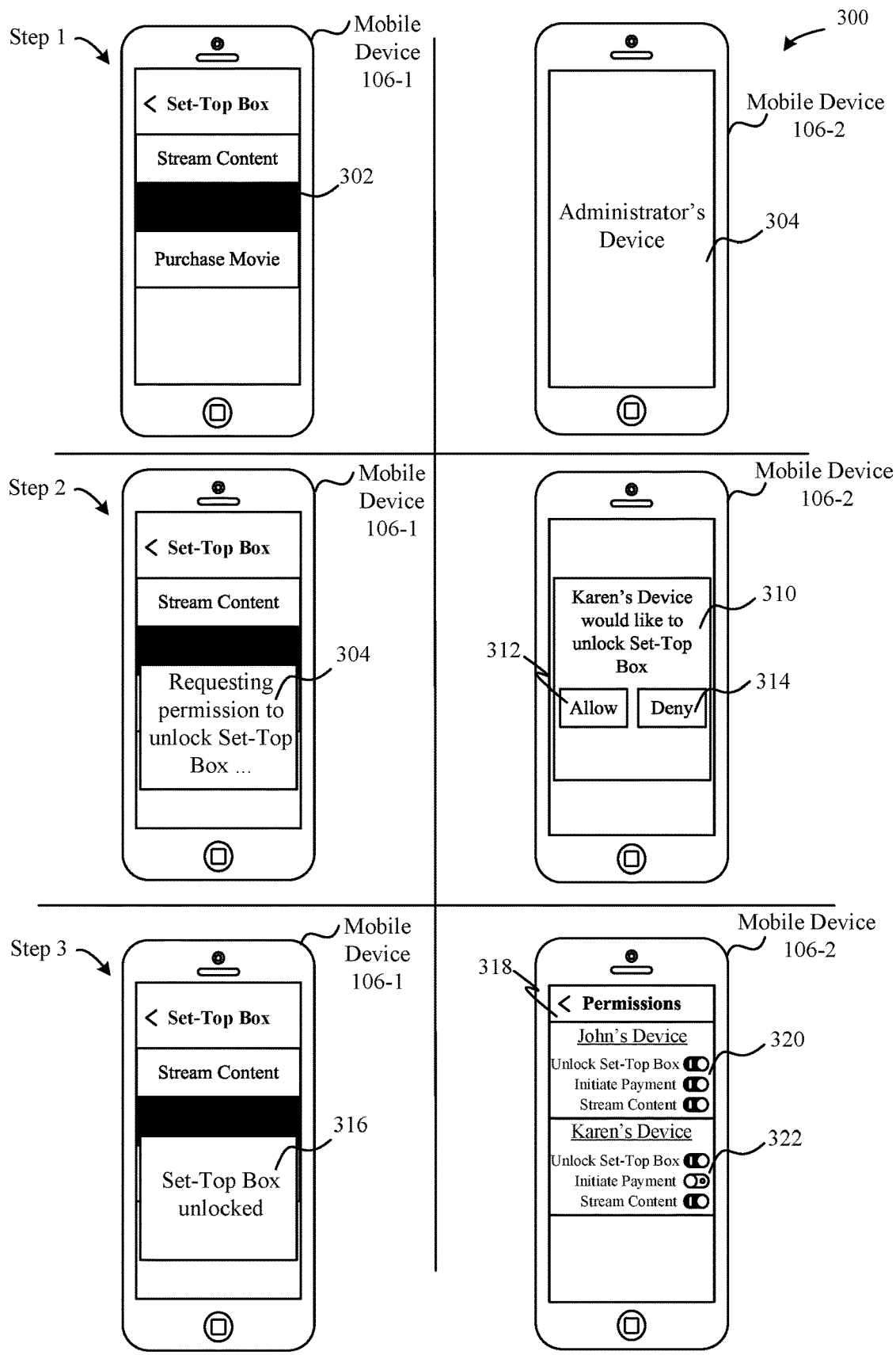
FIG. 3A illustrates a conceptual diagram of a wireless device granting another wireless device permission to unlock a set-top box, according to some embodiments.

FIG. 3A illustrates a conceptual diagram 300 of a wireless device granting another wireless device permission to unlock the set-top box 104, according to some embodiments. As shown in FIG. 3A, a mobile device 106-1 that is currently paired with set-top box 104 is attempting to unlock the set-top box 104. As previously set forth herein, the mobile device 106-1 can be granted a basic level of permissions by the set-top box 104 to interface with the set-top box 104 (e.g., stream content to the set-top box 104). However, the basic level of permissions can exclude other functionalities, such as unlocking the set-top box 104 to navigate a user interface provided by the set-top box 104. To cure this deficiency, when the mobile device 106-1 attempts to access prohibited functionalities, the set-top box 104 can be configured to identify a wireless device associated with administrative privileges, and forward a request to the wireless device to authorize the attempt, which is described below in conjunction with Steps 1-3 illustrated in FIG. 3A.

As depicted in Step 1, the mobile device 106-1 displays a user interface depicting a variety of functions that the mobile device 106-1 can request the set-top box 104 to perform, including a function 302 that reads "Unlock Set-Top Box." In the example illustrated in FIG. 3A, a mobile device 106-2 is associated with administrator-level permissions. According to some examples, the mobile device 106-2 received the administrator-level permissions by being the first wireless device to pair with the set-top box 104—for example, during the initial setup of the set-top box 104—or by receiving an assignment of administrator-level permissions from another wireless device/user account having a level of permissions sufficient for granting the mobile device 106-2 with administrator-level permissions. For example, a wireless device that possesses administrator-level permissions can operate the full set of functionalities offered by set-top box 104 as well as modify (e.g., add/subtract) permissions associated with other wireless devices known to the set-top box 104.

As depicted in Step 2, the mobile device 106-1 requests to unlock the set-top box 104 by selecting the "Unlock Set-Top Box" function 302. In response, a message 304 can be displayed that reads "Requesting Permission to Unlock Set-Top Box" while the user of mobile device 106-1 waits for an administrator to grant permission to unlock the set-top box 104. In response to the request from mobile device 106-1, the set-top box 104 can notify mobile device 106-2 that mobile device 106-1 is requesting permission to unlock the set-top box 104. Again, this can involve the set-top box 104 identifying that the mobile device 106-2 is associated with administrator-level permissions and forwarding the request to the mobile device 106-2, and/or to other wireless devices associated with administrator-level permissions (or permissions sufficient for granting the request to unlock the set-top box 104).

In some cases, an administrator (e.g., the mobile device 106-2) may not currently be communicably coupled with the set-top box 104 via a direct connection when the mobile device 106-1 issues the request to the set-top box 104. To cure this deficiency, the set-top box 104 can query the mobile device 106-2 over an indirect communication channel (e.g., the Internet) for the permission. In one example interface 310, the mobile device 106-2 can present an indication that reads "Karen's Device would like to unlock Set-Top Box", as well user interface elements that enable a user operating mobile device 106-2 to respond to the request, where "Karen's Device" corresponds to the mobile device 106-1. In response to receiving the request to unlock the set-top box 104, using the graphical user interface elements 312 (i.e., "Allow") and 314 (i.e., "Deny"), the administrator can decide whether to allow the request from "Karen's Device" to unlock the set-top box 104 or deny the request to unlock the set-top box 104.

According to some embodiments, the mobile device 106-2 can employ a variety of security prompts to help ensure that an authorized user is operating the mobile device 106-2. For example, the mobile device 106-2 can require an input of security credentials (e.g., password data, biometric data, etc.) in response to a user accepting or denying the request at the mobile device 106-2. In this manner, a malicious user operating the mobile device 106-1—and who has access to the mobile device 106-2 (e.g., a left-behind mobile device)—cannot simply hit the "accept" button on the mobile device 106-2 when attempting to unlock the set-top box 104 from the mobile device 106-1. Instead, the malicious user would also need to be able to provide the security credentials required by the mobile device 106-2, which he/she would unlikely be able to do.

At Step 3, the mobile device 106-2 grants the request to unlock the set-top box 104 (e.g., as indicated by element 316 in FIG. 3). According to some embodiments, in response to the mobile device 106-2 granting the request, the set-top box 104 can grant the mobile device 106-1 the necessary permissions for unlocking the set-top box 104. In some embodiments, such permissions can be granted on a "one-time" basis. For example, when a permission is granted on a "one-time" basis, and the mobile device 106-1 unpairs with the set-top box 104, the permission can be automatically revoked from the mobile device 106-1, e.g., by updating a permissions configuration managed by the set-top box 104. In another example, when a permission is granted on a "one-time" basis, the permission is automatically revoked after the mobile device 106-1 issues the request to unlock the set-top box 104. Alternatively, in other embodiments, when a permission is granted, that permission can remain in effect until one or more conditions are satisfied. For example, a condition can require the administrator to manually revoke the permission from the mobile device 106-1. In another example, the condition can be a time-based condition that expires after a threshold amount of time passes (e.g., grant permission for one hour, one day, one week, etc.). In yet another example, a geographic boundary can be defined (e.g., a radius around a building in which the set-top box 104 is located), and the permission can be automatically revoked upon the mobile device 106-1 falling outside of the geographic boundary (e.g., GeoFencing). It is noted that these are merely examples and that any condition can be implemented to cause the permission to be revoked from the mobile device 106-1 where appropriate.

Additionally, it is noted that the assignment of temporary/conditional permissions is not necessarily required to effect the unlocking of the set-top box 104 in the examples described herein, and that other approaches can be used. For example, the set-top box 104 can be configured to simply unlock itself in response to receiving the approval from the mobile device 106-2 instead of assigning the temporary/conditional permissions to the mobile device 106-1. In this manner, the mobile device 106-1 can be required to undergo the authentication process each time the mobile device 106-1 attempts to unlock the set-top box 104 when the set-top box 104 is in a locked state.

Additionally, and as shown in FIG. 3A, a permissions page 318 can be displayed at the mobile device 106-2 that allows different permissions to be assigned to different wireless devices known to the set-top box 104. For example, in a portion 322 of the permissions page 318 that depicts the list of permissions for "Karen's Device," permissions associated with unlocking the set-top box 104 and streaming content are toggled to the "on" position, and can represent the current configuration state after the mobile device 106-2 grants the request for the mobile device 106-1 to unlock the set-top box 104. For example, subsequent to granting the request, the mobile device 106-2 can prompt the administrator to determine whether he/she would like to enable the mobile device 106-1 to unlock the set-top box 104 at any time so that the administrator does not need to be bothered in the future. Additionally, permissions associated with initiating payments (e.g., purchasing/renting movies) using the set-top box 104 are toggled to the "off" position, as the administrator still may not be comfortable with the mobile device 106-1 purchasing content through the set-top box 104. In contrast, under a portion 320 of the permissions page 318 that represents permissions provided to "John's Device" (e.g., a mobile device 106 belonging to a user that the administrator trusts), permissions associated with unlocking the set-top box 104, steaming content to the set-top box 104, and initiating payments through the set-top box 104 can be toggled to the "on" position.

Figure 3B:
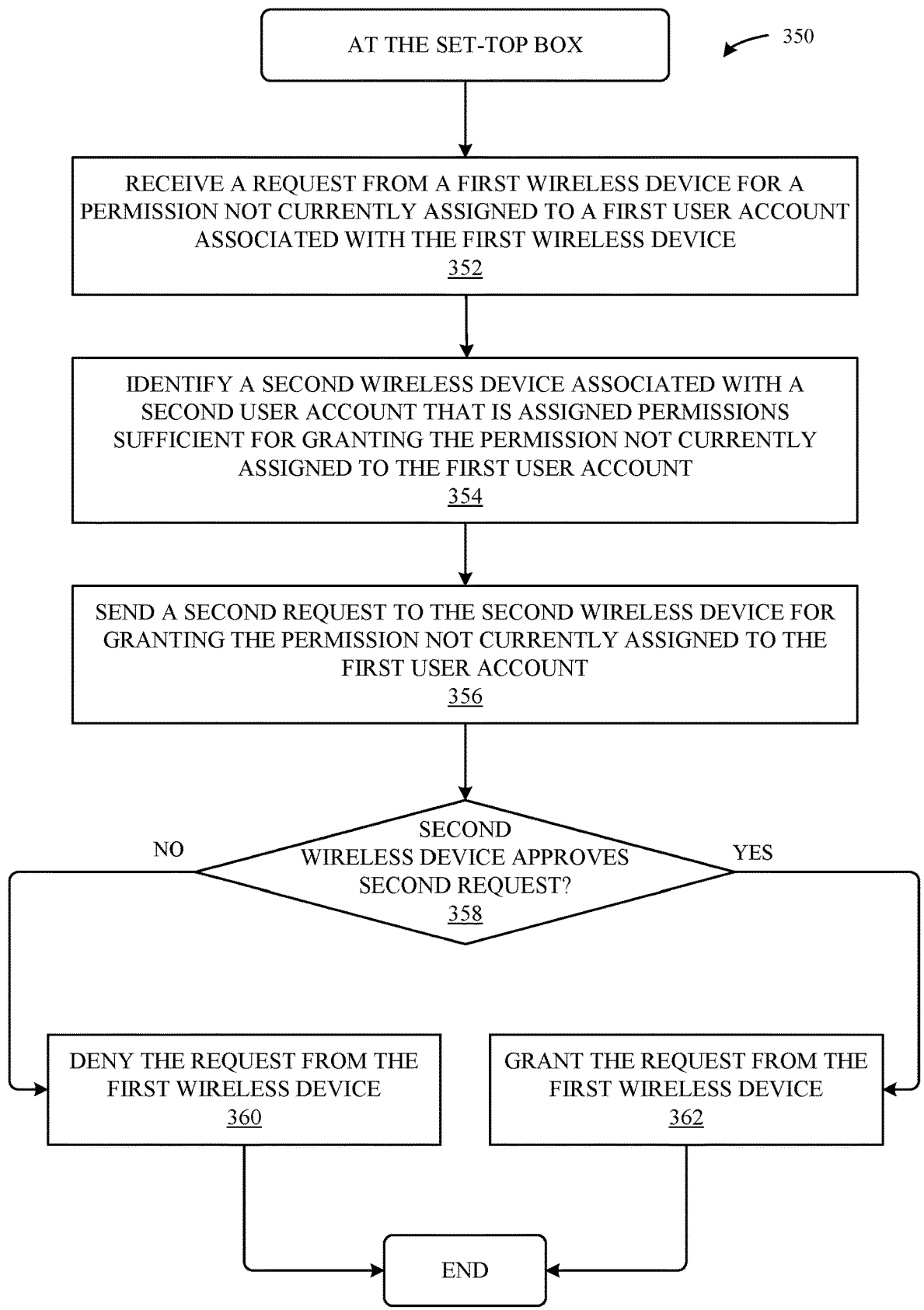
FIG. 3B illustrates a method for granting a wireless device permission to perform a particular function (in association with a set-top box) that the wireless device is not currently permitted to perform, according to some embodiments.

FIG. 3B illustrates a method 350 for granting a wireless device permission to perform a particular function (in association with the set-top box 104) that the wireless device is not currently permitted to perform, according to some embodiments. In particular, the method 350 provides a more detailed breakdown of the various steps carried out by the set-top box 104 as described above in conjunction with FIG. 3A. As shown in FIG. 3B, the method 350 begins at step 352, where the set-top box 104 receives a request from a first wireless device for a permission not currently assigned to the first wireless device/a first user account associated with the first wireless device. In one example, the request can be for a permission associated with unlocking the set-top box 104 for operation, as described above in conjunction with Step 1 of FIG. 3A. In some embodiments, the set-top box 104 can determine that the user account associated with the first wireless device has not been granted the necessary level of permissions for unlocking the set-top box 104 for operation.

At step 354, the set-top box 104 can identify a second wireless device associated with a second user account that is assigned permissions sufficient for granting the permission not currently assigned to the first user account. In one example, the set-top box 104 can identify an administrator (i.e., the second user account referenced in step 354) and query the administrator for approval to grant the first wireless device/first user account the permission associated with the request. At step 356, when the second wireless device is identified, the set-top box 104 can send a second request to the second wireless device for granting the permission not currently assigned to the first user account. Subsequently, the second wireless device can display a prompt (e.g., to an authorized user of the second wireless device) and an option to allow the first wireless device to be granted the permission, in accordance with Step 2 described above in conjunction with FIG. 3A.

At step 358, the set-top box 104 receives a response from the second wireless device indicating whether the second wireless device approves the second request. In one example, step 360 can represent the administrator of the second wireless device denying the request, where, in turn, the set-top box 104 does not grant the first wireless device the permission. According to some embodiments, the request can time out after a threshold amount of time, and the denial can be issued by the set-top box 104 on behalf of the administrator/second wireless device as appropriate. In such a case, the first wireless device can be configured to display an indication of the timeout so that a user of the first wireless device can attempt to contact the administrator via other means. Alternatively, step 362 can represent the administrator of the second wireless device accepting the request from the first wireless device, whereupon the set-top box 104 grants the request to the first wireless device.

Figure 4A:
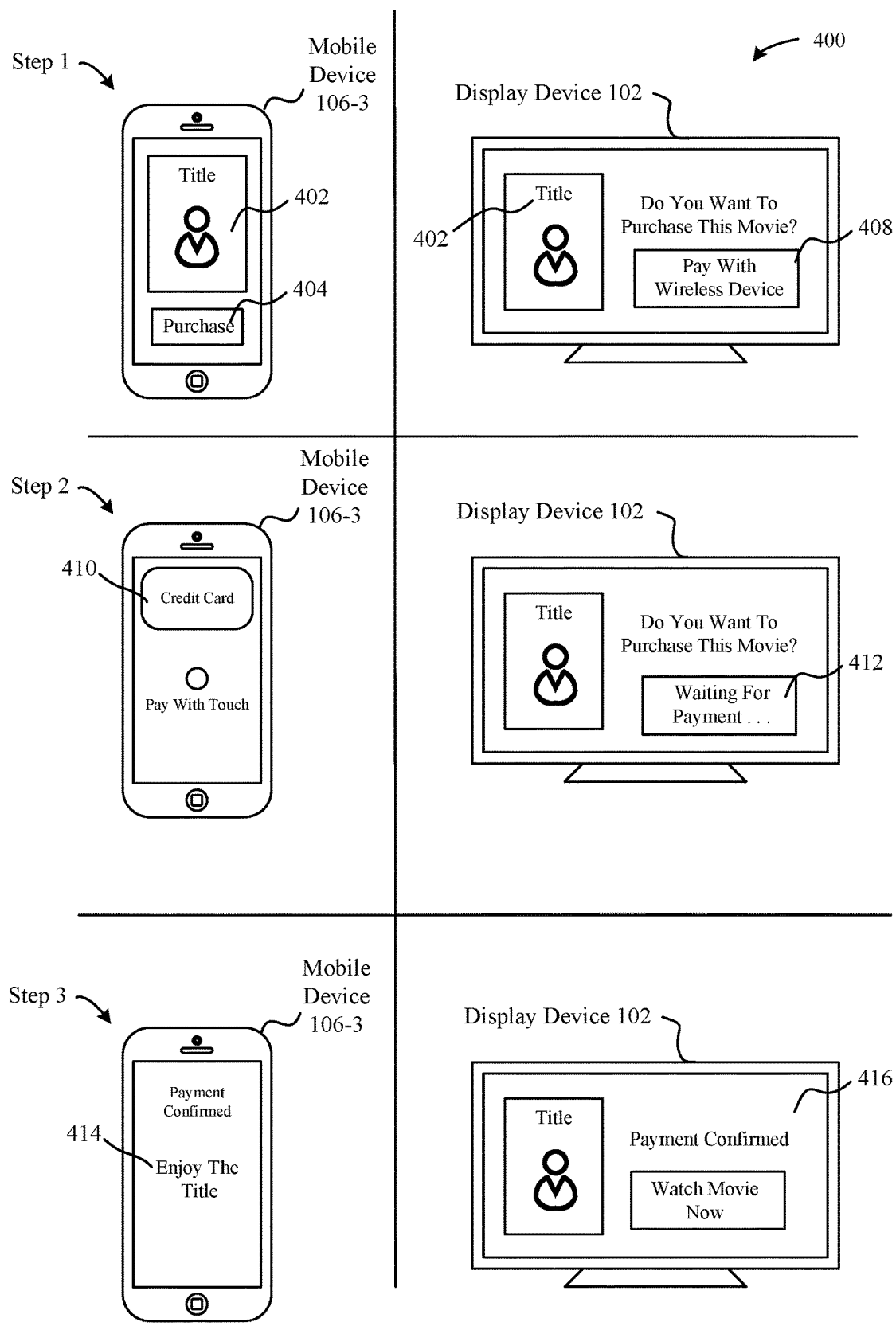
FIG. 4A illustrates a conceptual diagram of a wireless device purchasing a content item in conjunction with a set-top box, according to some embodiments.

FIG. 4A illustrates a conceptual diagram 400 of a wireless device purchasing a content item in conjunction with set-top box 104, according to some embodiments. In the example scenario illustrated in FIG. 4A, a mobile device 106-3 has paired with set-top box 104 and has at least obtained a permission to navigate a user interface of the set-top box 104. In one example, the mobile device 106-3 received the permission to navigate the set-top box 104 as part of a level of permissions that were granted to the mobile device 106-3 in response to initially pairing with the set-top box 104.

As shown in Step 1, the mobile device 106-3—which is being used to navigate the user interface of the set-top box 104—has indicated an interest in purchasing a movie title 402. In order to complete the purchase, the mobile device 106-3 must obtain a permission associated with purchasing content items. In one example, the set-top box 104 can display the capability of purchasing the movie title 402, as well as a user interface element 408 that reads "Pay With Wireless Device". In the same light, the mobile device 106-3 can display the movie title 402 and an option 404 to purchase the movie title using the mobile device 106-3. However, the mobile device 106-3 will only be permitted to complete the purchase when the mobile device 106-3 is assigned permissions associated with initiating payments using the set-top box 104, which may or may not be the case depending on the permissions currently assigned to the mobile device 106-3.

At Step 2, a user operating the mobile device 106-3 indicates the desire to purchase the movie title 402 (e.g., by selecting the option 404 to purchase the movie title 402 at the mobile device 106-3), and the set-top box 104 waits for the mobile device 106-3 to initiate a payment (e.g., as indicated by element 412 in FIG. 4A). As previously noted above, the mobile device 106-3/user account associated therewith may already be assigned permissions for purchasing content items (in conjunction with the set-top box 104). Alternatively, if the permissions are not already assigned, the set-top box 104 can issue a request to an administrator (or other appropriate permissions-equipped device(s)/user(s) known to the set-top box 104) for the permissions in accordance with the teachings of FIGS. 3A-3B.

In either case, when the permissions are assigned to the mobile device 106-3, the user operating mobile device 106-3 can be prompted to complete the payment (e.g., as indicated by element 410 in FIG. 4A). According to some embodiments, the user can apply payment credentials associated with the mobile device 106-3 to purchase the content item at the set-top box 104, e.g., using Apple Pay by Apple®. In other embodiments, the user can utilize payment credentials associated with another wireless device. For example, an administrator can grant the mobile device 106-3 permissions to use their payment credentials at any time. In this example, several wireless devices that each are associated with respective user accounts—such as wireless devices owned by members of a family—can purchase media content (e.g., a movie title 402) with a single set of payment credentials shared by the family (e.g., a family credit card). Notably, allowing users to purchase content items using payment credentials associated with their mobile devices 106 can increase the security of the set-top box 104 as those users will be prohibited from simply accessing payment credentials managed on the set-top box 104 (if any) to complete the payment.

At Step 3, the set-top box 104 determines that the mobile device 106-3 has successfully completed payment for the content item. According to some embodiments, when the payment is successfully completed at the mobile device 106-3, the mobile device 106-3 can be configured to issue a secure message to the set-top box 104 indicating that the payment was successful. In turn, the set-top box 104 can present an indication 416 that the payment has been confirmed, and the mobile device 106-3 can present an indication 414 that the content item is ready to be viewed on the set-top box 104.

Figure 4B:
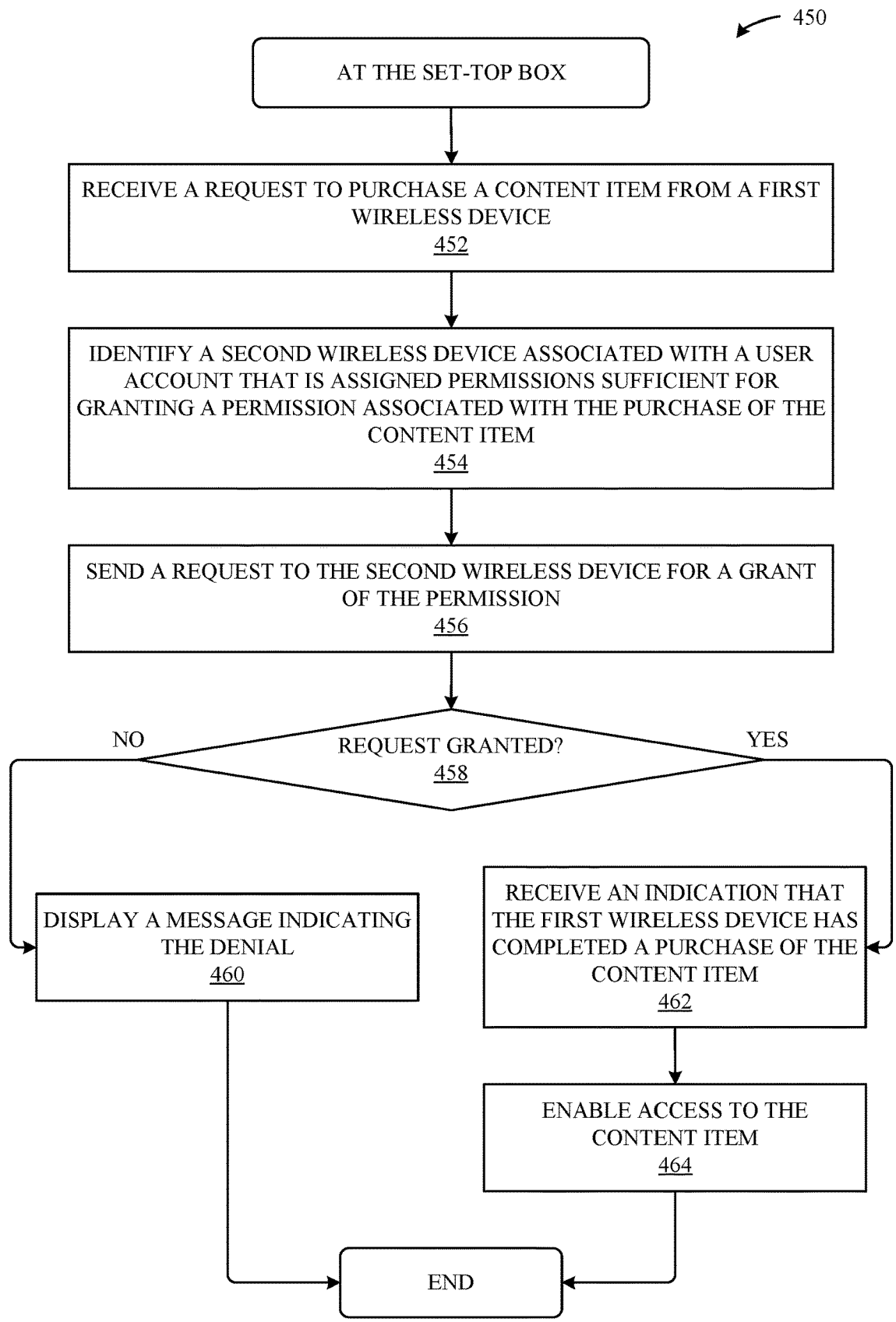
FIG. 4B illustrates a method for a wireless device to purchase a content item through a set-top box, according to some embodiments.

FIG. 4B illustrates a method 450 for a wireless device to purchase a content item through the set-top box 104, according to some embodiments. In particular, the method 450 provides an alternative to the various steps carried out by the set-top box 104 as described above in conjunction with FIG. 4A. As shown in FIG. 4B, the method 450 begins at step 452 where the set-top box 104 receives a request to purchase a content item from a first wireless device. At step 454, the set-top box 104 can identify a second wireless device associated with a user account that is assigned permissions sufficient for granting a permission associated with purchasing a content item. At step 456, the set-top box 104 can send a request to the second wireless device to grant the permission that has been requested. At decision block 458, the set-top box 104 can wait for a response from the second wireless device—e.g., an administrator operating the second wireless device—that can either grant or deny the request.

According to some embodiments, at step 460, the request is denied by the second wireless device, and the set-top box 104 can cause a message to be displayed at the first wireless device indicating that the first wireless device will not be granted the permission associated with purchasing the content item. Alternatively, at step 462, the set-top box 104 can allow the first wireless device to purchase the content item, and can wait to receive an indication that the first wireless device has completed a purchase of the content item. Subsequently, at block 464, the indication 416 can enable access to the content item, e.g., play back the content item via a display device 102 to which the set-top box 104 is communicably coupled.

Figure 5A:
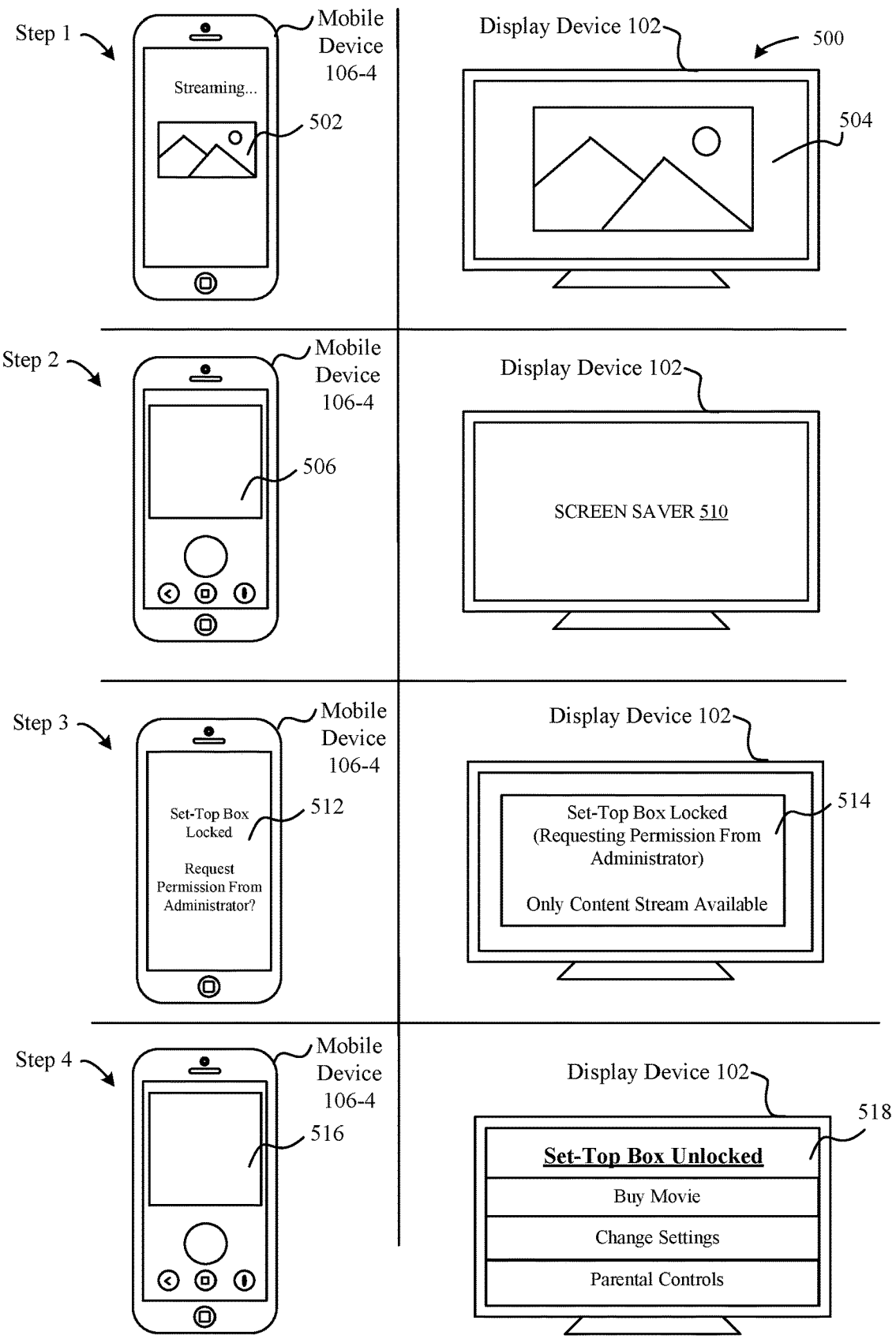
FIG. 5A illustrates a conceptual diagram of a mobile device causing a set-top box to perform different functionalities in accordance with permissions assigned to the mobile device, according to some embodiments.

FIG. 5A illustrates a conceptual diagram 500 of a mobile device 106-4 causing the set-top box 104 to perform different functionalities in accordance with permissions assigned to the mobile device 106-4, according to some embodiments. As depicted in Step 1, the mobile device 106-4 is streaming a media item 502 to the display device 102 (e.g., via the set-top box 104). In particular, the display device 102 is displaying the media item 502 in an example interface 504. In this example, streaming the media item 502 is associated with a level of permissions that are granted to the mobile device 106-4 upon a successful pairing with the set-top box 104, and does not require the set-top box 104 to be unlocked. In some embodiments, an administrator can designate specific actions that require the set-top box 104 to first be unlocked, e.g., streaming content. In other embodiments, some actions, such as streaming, can be available without requiring the set-top box 104 to be unlocked.

At Step 2, the mobile device 106-4 has stopped streaming the content to the set-top box 104 and is attempting to navigate a user interface of the set-top box 104 (e.g., using a track pad 506 provided by an application for remotely-controlling the set-top box 104). In this example, navigating the set-top box 104 is an action that requires a heightened level of permissions, and the mobile device 106-4 can be prevented from navigating the set-top box 104 until the mobile device 106-4 receives a permission associated with unlocking the set-top box 104. As shown in FIG. 5A, as the mobile device 106 is transitioning to navigating the set-top box 104, the display device 102 can display a screen saver 510.

At Step 3, the mobile device 106-4 is prevented from unlocking the set-top box 104 because the mobile device 106-4 has not obtained the heightened level of permissions required to unlock the set-top box. In one example user interface 512, the mobile device 106-4 is alerted that the set-top box 104 is locked. Moreover, at Step 4, the set-top box 104 can issue a request for the necessary permissions to an administrator on behalf of the mobile device 106-4 to unlock the set-top box 104. Similarly, the set-top box 104 can display an indication that the set-top box 104 is locked/requesting permission from the administrator to grant the mobile device 106-4 the necessary permissions to unlock the set-top box 104 (e.g., as indicated by element 514 in FIG. 5).

At Step 4, an administrator (or other authorized wireless device/user account) has granted the mobile device 106-4 the permissions necessary to unlock the set-top box 104. A user of mobile device 106-4 is now able to navigate track pad 516 to control the set-top box 104. Similarly, the set-top box 104 can now allow the mobile device 106-4 to navigate the set-top box 104 as depicted in the example interface 518.

Figure 5B:
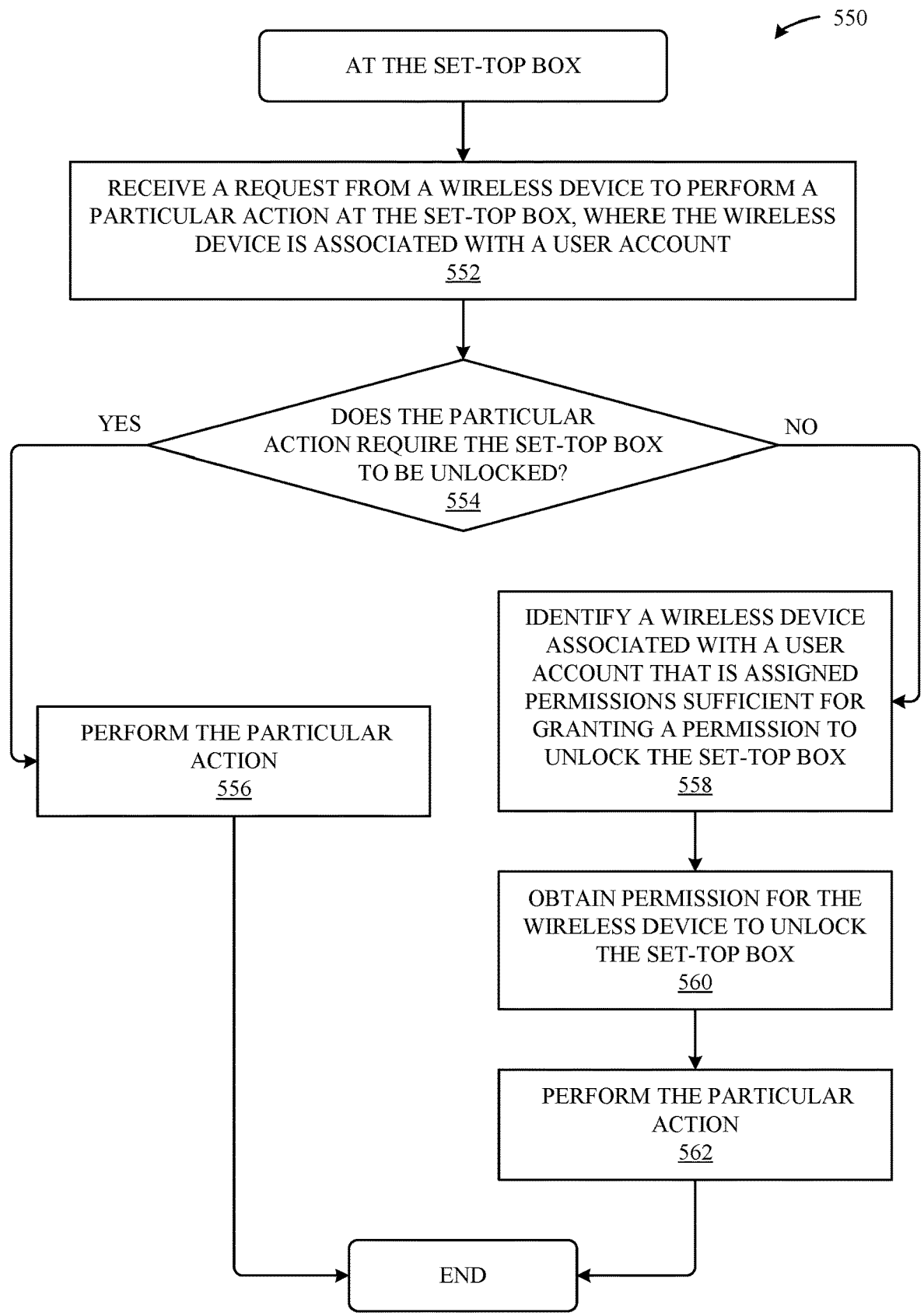
FIG. 5B illustrates a method that involves a mobile device causing a set-top box to perform different functionalities in accordance with permissions assigned to the mobile device, according to some embodiments.

FIG. 5B illustrates a method 550 that involves a wireless device causing the set-top box 104 to perform different functionalities in accordance with permissions assigned to the wireless device, according to some embodiments. In particular, the method 550 provides a more detailed breakdown of the various steps carried out by the set-top box 104 as described above in conjunction with FIG. 5A. As shown in FIG. 5B, the method 550 begins at step 552, where the set-top box 104 receives a request from a wireless device to perform a particular action at the set-top box 104. In one example, the particular action can involve streaming content to the set-top box 104.

At step 554, the set-top box 104 can determine whether the particular action requires the set-top box 104 to be unlocked. Again, an administrator associated with the set-top box 104 can specify actions that can be performed at the set-top box 104 without requiring the set-top box 104 to be unlocked. In this example, the administrator can specify that streaming content from a wireless device to the set-top box 104 does not require the set-top box 104 to be unlocked. However, the administrator can specify that other actions—such as accessing payment credentials or purchasing movies—do require that the set-top box 104 is first unlocked. Accordingly, the wireless device must be granted a heightened level of permissions associated with unlocking the set-top box 104 in order to perform a particular action that requires the set-top box 104 to be unlocked.

At step 556, the set-top box 104 determines that the particular action does not require the set-top box 104 to be unlocked, and allows the wireless device to perform the particular action at the set-top box 104. In one example, when the set-top box 104 does not need to be unlocked to perform the particular action, the wireless device can perform that action without receiving the heightened level of permissions.

At step 558, the set-top box 104 determines that the particular action requires the set-top box 104 to be unlocked. In response, the set-top box 104 can identify a different wireless device associated with a user account that is assigned permissions sufficient for granting the permissions to unlock the set-top box 104. Next, at step 560, the set-top box 104 can obtain the permission (e.g., from an administrator) for the wireless device to unlock the set-top box 104 and perform the particular action. In response to receiving the permission, the set-top box 104 can grant the wireless device permission to unlock the set-top box 104 and allow the wireless device, at step 562, to perform the particular action. Moreover, in some embodiments, the granted permission can be remembered by the set-top box 104 such that the wireless device will be allowed to unlock the set-top box 104 each time it pairs with the set-top box 104.

Figure 6A:
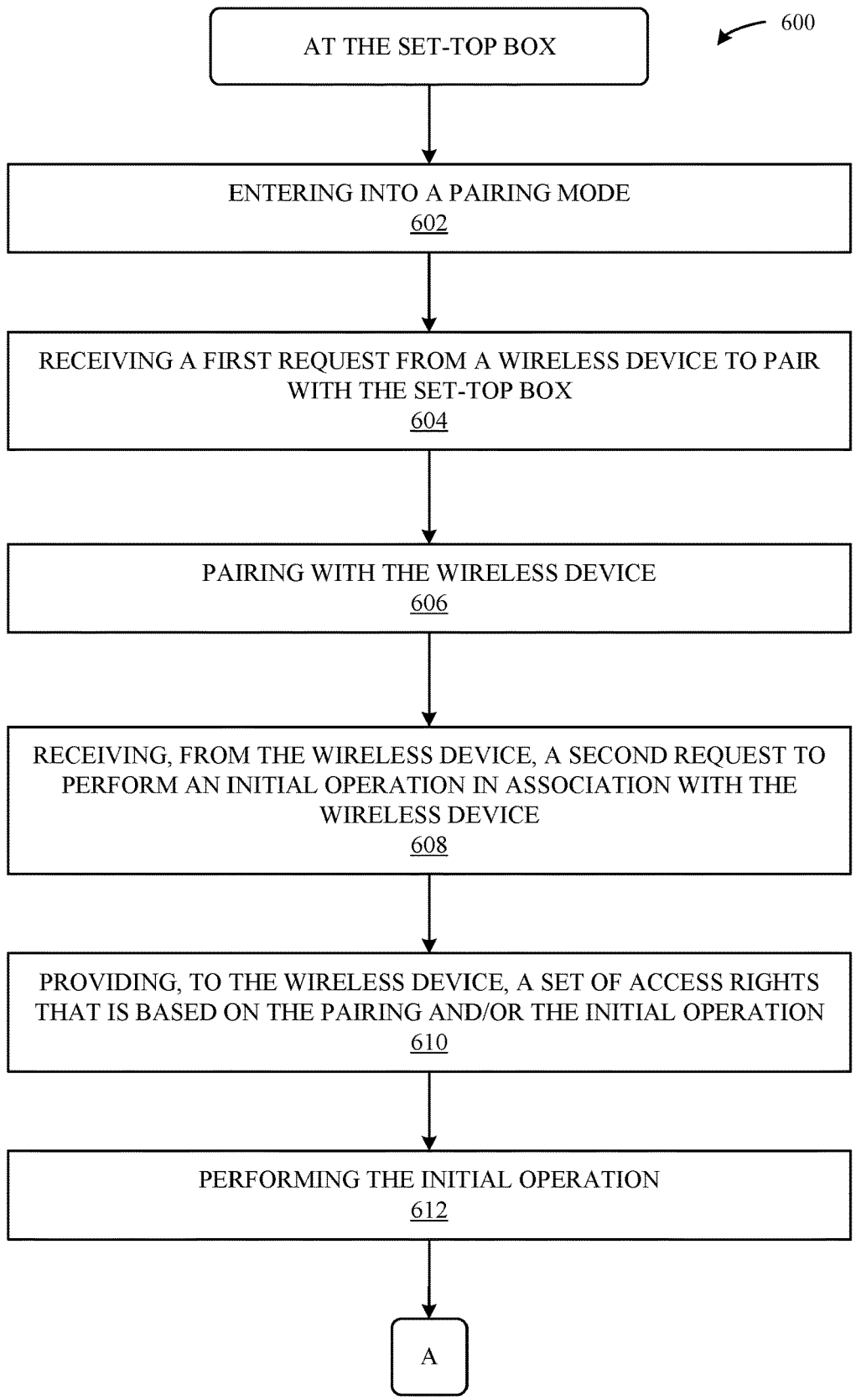
FIGS. 6A-6B illustrate a method for automatically establishing privilege levels for a wireless device based on an initial pairing and/or operation performed in conjunction with the wireless device, according to some embodiments.
Figure 6B:
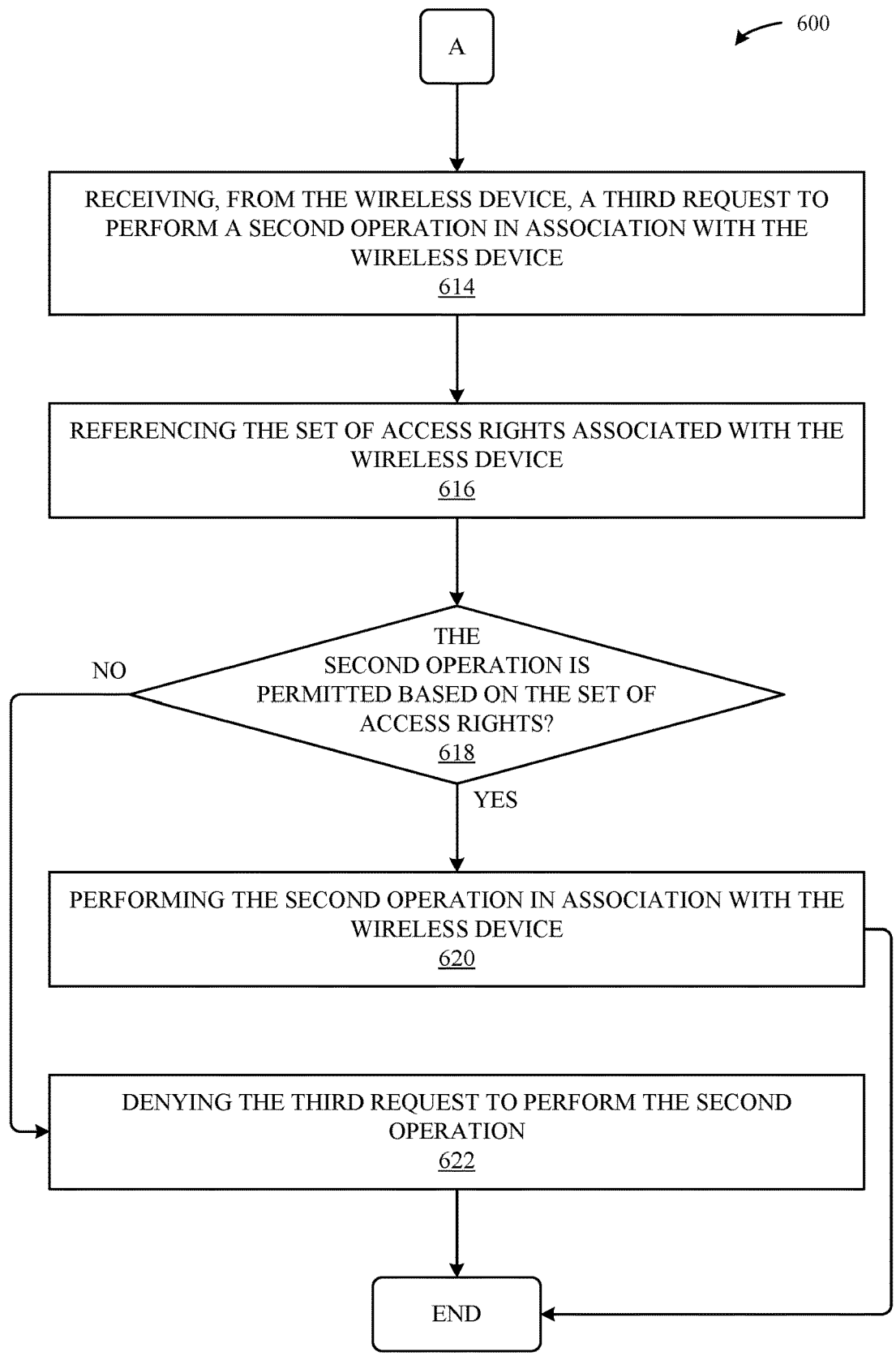

Additionally, FIGS. 6A-6B illustrate a method 600, implemented by the set-top box 104, for automatically establishing privilege levels for a wireless device based on an initial pairing and/or operation performed in conjunction with the wireless device, according to some embodiments. As shown in FIG. 6A, the method 600 begins at step 602, where the set-top box 104 enters into a pairing mode. For example, the set-top box 104 can actively broadcast pairing availability through a direct wireless connection (e.g., Bluetooth, WiFi, etc.) to the wireless device, through an existing wireless connection with which the set-top box 104 and the wireless device are already connected (e.g., a WiFi network), and so on.

Next, at step 604, the set-top box 104 receives a first request from the wireless device to pair with the set-top box. For example, the wireless device can issue the first request in conjunction with a user seeking to perform one or more operations in association with the set-top box 104 (e.g., streaming content to the set-top box 104, remote-controlling the set-top box 104 (e.g., using an application installed on the wireless device), and so on). In any case, the set-top box 104 can pair with the wireless device using different approaches to establish different levels of authorization to perform a desired initial operation (described below at step 606). For example, when the wireless device seeks to only stream content to the set-top box 104, a pairing can be established via a direct connection between the set-top box 104 and the wireless device (e.g., using Bluetooth) (where no on-screen code is required (e.g., as described above in conjunction with FIG. 2A)). In another example, when the wireless device seeks to remotely-control the set-top box 104, the set-top box 104 can require a more advanced pairing (e.g., the on-screen code approach described above in conjunction with FIG. 2A).

In any case, at step 606, the set-top box 104 pairs with the wireless device. Next, at step 608, the set-top box 104 receives, from the wireless device, a second request to perform an initial operation in association with the wireless device. In response, at step 610, the set-top box 104 provides, to the wireless device, a set of access rights. According to some embodiments, the set of access rights can be based on (1) the manner in which the wireless device and the set-top box 104 were initially paired (e.g., at step 606), and/or (2) the second request to perform the initial operation. For example, when the initial operation involves performing a screen-casting from the wireless device to the set-top box 104, the set of access rights can limit the wireless device to only being able to perform screen castings with the set-top box 104. In another example, when the initial operation involves performing a remote-control operation between the wireless device and the set-top box 104, the set of access rights can limit the wireless device to only being able to perform: (1) remote control operation between the wireless device and the set-top box 104, and (2) screen-castings from the wireless device to the set-top box 104. In yet another example, when the initial operation involves performing a screen recording at the set-top box 104 (e.g., under the direction of the wireless device), the set of access rights can limit the wireless device to only being able to perform: (1) screen recordings at the set-top box 104 under the direction of the wireless device, (2) remote control operation between the wireless device and the set-top box 104, and (3) screen-castings from the wireless device to the set-top box 104. It is noted that the foregoing examples are merely exemplary, and that any number of operations can be specified within the sets of access rights described herein.

In any case, at step 612, the set-top box 104 performs the initial operation. Next, in FIG. 6B, at step 614, the set-top box 104 receives, from the wireless device, a third request to perform a second operation in association with the wireless device. At step 616, the set-top box 104 references the set of access rights associated with the wireless device to identify whether the third operation is permitted to be performed. For example, the set-top box 104 can reference the second operation against the set of access rights to identify whether the set-top box 104 should permit the wireless device to perform the third operation (in conjunction with the set-top box 104). For example, when the initial pairing involves a simple/direct pairing between the set-top box 104—and the initial operation involves a screen cast—the wireless device can be limited only to performing subsequent screen casts with the set-top box 104 (at least until a more secure pairing is formed (e.g., in accordance with FIG. 2A)). In this example, when the wireless device attempts to perform an elevated operation—e.g., an operation that exceeds those listed in the set of access rights as being permitted—the set-top box 104 can deny the request.

Accordingly, at step 618, the set-top box 104 determines whether the second operation is permitted based on the set of access rights. If, at step 618, the set-top box 104 determines that the second operation is permitted based on the set of access rights, then the method 600 proceeds to step 620, where the set-top box 104 performs the second operation in association with the wireless device. Otherwise, the method 600 proceeds to step 622, where the set-top box 104 denies the third request to perform the second operation. According to some embodiments, in conjunction with denying the request, the set-top box 104 can indicate to the wireless device (and an operating user) that a more-secure pairing procedure needs to take place.

It is noted that the foregoing scenarios involving the set-top box 104 and the wireless device are merely exemplary and not meant to be limiting in any fashion. On the contrary, any form of computing device can be configured to implement the functionality of the set-top box 104, and any form of computing device can be configured to implement the functionality of the wireless device. It is additionally noted that the various interactions described herein can be conducted over both wireless and wired connections.

Figure 7:
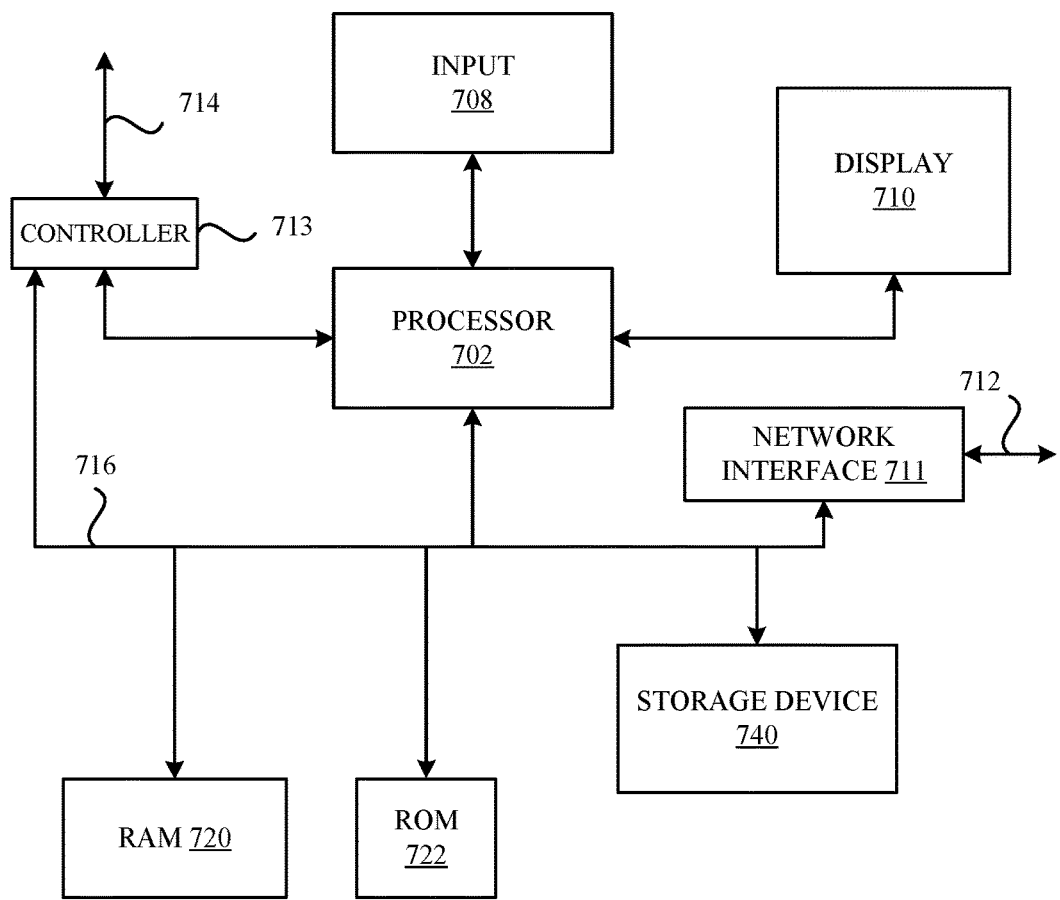
FIG. 7 illustrates a detailed view of a computing device that can be used to implement the various techniques described herein, according to some embodiments.

FIG. 7 illustrates a detailed view of a computing device 700 that can be used to implement the various components described herein, according to some embodiments. In particular, the detailed view illustrates various components that can be included in the mobile device 106, tablet device 108, wearable device 110, set-top box 104, and display device 102 illustrated in FIG. 1. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712, where the network/bus interface 711 can be used, for example, to transmit the messages discussed in reference to FIGS. 1, 2A-2C, 3A-3B, 4A-4B, and 5A-5B. In the case of a wireless connection, the network/bus interface 711 can include a wireless transceiver.

As noted above, the computing device 700 also include the storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of applications executing on the set-top box 104, as well as the mobile device 106, the tablet device 108, and the wearable device 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing wireless device permissions, the method comprising, at a host device:
   pairing with a wireless device in response to receiving, from the wireless device, a first request to perform a pairing process;
   receiving, from the wireless device, a second request to perform an initial operation;
   providing, to the wireless device, a set of access rights that is based on limits of the initial operation;
   performing the initial operation in conjunction with the wireless device;
   receiving a third request to perform a second operation, wherein the second operation is distinct to the initial operation;
   determining that the second operation requires access rights that are not included in the set of access rights; and
   denying the second operation.

2. The method of claim 1, further comprising, prior to receiving the first request:
   entering into a pairing mode.

3. The method of claim 1, wherein, when the initial operation comprises performing a screen-casting from the wireless device to the host device, the set of access rights is limited to performing screen-castings.

4. The method of claim 1, wherein, when the initial operation comprises performing a remote-control operation between the wireless device and the host device, the set of access rights includes: (1) remote control operation between the wireless device and the host device, and (2) screen-castings from the wireless device to the host device.

5. The method of claim 1, wherein, when the initial operation comprises performing a screen recording at the host device under a direction of the wireless device, the set of access rights includes: (1) performing screen recordings at the host device under the direction of the wireless device, (2) remote control operation between the wireless device and the host device, and (3) screen-castings from the wireless device to the host device.

6. The method of claim 1, wherein the host device is a set-top box, and the wireless device is a desktop, a laptop, a tablet, a smartphone, or a smartwatch.

7. The method of claim 1, wherein the first request to perform the pairing process with the wireless device is received in conjunction with a tap to set up feature.

8. A non-transitory computer readable storage medium configured to store instructions that, when executed by a processor included in a host device, cause the host device to manage wireless device permissions, by carrying out steps that include:
- pairing with a wireless device in response to receiving, from the wireless device, a first request to perform a pairing process;
- receiving, from the wireless device, a second request to perform an initial operation;
- providing, to the wireless device, a set of access rights that is based on limits of the initial operation;
- performing the initial operation in conjunction with the wireless device;
- receiving a third request to perform a second operation, wherein the second operation is distinct to the initial operation;
- determining that the second operation requires access rights that are not included in the set of access rights; and
- denying the second operation.

9. The non-transitory computer readable storage medium of claim 8, wherein the steps further include, prior to receiving the first request:
- entering into a pairing mode.

10. The non-transitory computer readable storage medium of claim 8, wherein, when the initial operation comprises performing a screen-casting from the wireless device to the host device, the set of access rights is limited to performing screen-castings.

11. The non-transitory computer readable storage medium of claim 8, wherein, when the initial operation comprises performing a remote-control operation between the wireless device and the host device, the set of access rights includes: (1) remote control operation between the wireless device and the host device, and (2) screen-castings from the wireless device to the host device.

12. The non-transitory computer readable storage medium of claim 8, wherein, when the initial operation comprises performing a screen recording at the host device under a direction of the wireless device, the set of access rights includes: (1) performing screen recordings at the host device under the direction of the wireless device, (2) remote control operation between the wireless device and the host device, and (3) screen-castings from the wireless device to the host device.

13. The non-transitory computer readable storage medium of claim 8, wherein the host device is a set-top box, and the wireless device is a desktop, a laptop, a tablet, a smartphone, or a smartwatch.

14. The non-transitory computer readable storage medium of claim 8, wherein the first request to perform the pairing process with the wireless device is received in conjunction with a tap to set up feature.

15. A host device configured to manage wireless device permissions, the host device comprising:
- at least one processor; and
- at least one memory storing instructions that, when executed by the at least one processor, cause the host device to perform steps that include:
  - pairing with a wireless device in response to receiving, from the wireless device, a first request to perform a pairing process;
  - receiving, from the wireless device, a second request to perform an initial operation;
  - providing, to the wireless device, a set of access rights that is based on limits of the initial operation;
  - performing the initial operation in conjunction with the wireless device;
  - receiving a third request to perform a second operation, wherein the second operation is distinct to the initial operation;
  - determining that the second operation requires access rights that are not included in the set of access rights; and
  - denying the second operation.

16. The host device of claim 15, wherein the steps further include, prior to receiving the first request:
- entering into a pairing mode.

17. The host device of claim 15, wherein, when the initial operation comprises performing a screen-casting from the wireless device to the host device, the set of access rights is limited to performing screen-castings.

18. The host device of claim 15, wherein, when the initial operation comprises performing a remote-control operation between the wireless device and the host device, the set of access rights includes: (1) remote control operation between the wireless device and the host device, and (2) screen-castings from the wireless device to the host device.

19. The host device of claim 15, wherein, when the initial operation comprises performing a screen recording at the host device under a direction of the wireless device, the set of access rights includes: (1) performing screen recordings at the host device under the direction of the wireless device, (2) remote control operation between the wireless device and the host device, and (3) screen-castings from the wireless device to the host device.

20. The host device of claim 15, wherein the host device is a set-top box, and the wireless device is a desktop, a laptop, a tablet, a smartphone, or a smartwatch.

* * * * *